US012420555B2

(12) United States Patent
Furuhata et al.

(10) Patent No.: US 12,420,555 B2
(45) Date of Patent: Sep. 23, 2025

(54) LIQUID DISCHARGE APPARATUS AND STORAGE DEVICE

(71) Applicant: SEIKO EPSON CORPORATION, Tokyo (JP)

(72) Inventors: Makoto Furuhata, Nagano (JP); Yasuhiro Hosokawa, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 138 days.

(21) Appl. No.: 18/424,935

(22) Filed: Jan. 29, 2024

(65) Prior Publication Data

US 2024/0253358 A1 Aug. 1, 2024

(30) Foreign Application Priority Data

Jan. 30, 2023 (JP) ................................ 2023-011635

(51) Int. Cl.
*B41J 2/175* (2006.01)

(52) U.S. Cl.
CPC ....... *B41J 2/17513* (2013.01); *B41J 2/17566* (2013.01); *B41J 2002/17579* (2013.01)

(58) Field of Classification Search
CPC .... B41J 2/175; B41J 2/17506; B41J 2/17509; B41J 2/17513; B41J 2/1752; B41J 2/1753; B41J 2/17553; B41J 2/17566; B41J 2002/17579; B41J 2002/17516; B41J 29/13
See application file for complete search history.

(56) References Cited

U.S. PATENT DOCUMENTS 4,099,167 A * 7/1978 Pomerantz ............ G01F 23/265 73/304 C
5,465,619 A * 11/1995 Sotack ............... G03G 15/0856 118/694
5,747,689 A * 5/1998 Hampo ................ G01F 23/265 73/304 C
9,415,601 B1 * 8/2016 Tsukida ............... B41J 2/17566
2017/0297345 A1 * 10/2017 Usui .................... B41J 2/17546
2021/0094307 A1 4/2021 Yonemura
2022/0134768 A1 * 5/2022 Shinkawa ............ B41J 2/17566 347/7

FOREIGN PATENT DOCUMENTS

JP 2021-056079 A 4/2021

* cited by examiner

*Primary Examiner* — Anh T Vo
(74) *Attorney, Agent, or Firm* — Global IP Counselors, LLP

(57) ABSTRACT

A liquid discharge apparatus includes a storage section including a plurality of walls and storing a liquid in a space surrounded by the plurality of walls, a discharging section that discharges the liquid supplied from the storage section, a first electrode and a second electrode that are provided on a first surface of a first wall among the plurality of walls for detecting a remaining amount of the liquid in the storage section, and a protrusion portion that is provided on a second surface of the first wall opposite to the first surface, in which the protrusion portion is located between the first electrode and the second electrode in a first direction, which is a direction in which the liquid decreases in the storage section.

12 Claims, 10 Drawing Sheets

LIQUID DISCHARGE APPARATUS AND STORAGE DEVICE

The present application is based on, and claims priority from JP Application Serial Number 2023-011635, filed Jan. 30, 2023, the disclosure of which is hereby incorporated by reference herein in its entirety.

BACKGROUND

1. Technical Field

The present disclosure relates to a liquid discharge apparatus and a storage device.

2. Related Art

A technique for detecting a remaining amount of an object stored in a container has been proposed. For example, in JP-A-2021-056079, a technique relating to a detection device including a container for storing an object, a plurality of detection electrodes provided on an outer surface of a side wall of the container, and a detection section for detecting a remaining amount of the object stored in the container based on signals output from the plurality of detection electrodes has been proposed.

However, in the technique of the related art, when a non-detection material, such as a liquid droplet, adheres to an inner surface of a wall provided with a plurality of detection electrodes, the non-detection material adhering to the inner surface of the wall affects the detection by the plurality of detection electrodes, resulting in problems such as an erroneous detection.

SUMMARY

According to an aspect of the present disclosure, a liquid discharge apparatus includes a storage section that includes a plurality of walls and stores a liquid in a space surrounded by the plurality of walls, a discharging section that discharges the liquid supplied from the storage section, a first electrode and a second electrode that are provided on a first surface of a first wall among the plurality of walls for detecting a remaining amount of the liquid in the storage section, and a protrusion portion that is provided on a second surface of the first wall opposite to the first surface, in which the protrusion portion is located between the first electrode and the second electrode in a first direction, which is a direction in which the liquid decreases in the storage section.

According to another aspect of the present disclosure, a storage device includes a storage section that includes a plurality of walls and stores an object in a space surrounded by the plurality of walls, a first electrode and a second electrode that are provided on a first surface of a first wall among the plurality of walls for detecting a remaining amount of the object in the storage section, and a protrusion portion that is provided on a second surface of the first wall opposite to the first surface, in which the protrusion portion is located between the first electrode and the second electrode in a first direction, which is a direction in which the object decreases in the storage section.

DESCRIPTION OF EMBODIMENTS

In the following, embodiments for carrying out the present disclosure will be explained with reference to the accompanying drawings. However, in each drawing, the size and scale of each section are appropriately different from the actual ones. In addition, since the embodiments described in the following are preferred specific examples of the present disclosure, various technically preferable limitations are attached, but the scope of the present disclosure is not limited to the embodiments unless otherwise stated to specifically limit the present disclosure in the following explanation.

A. Embodiment

In the following, an ink jet printer 100 according to an embodiment will be explained.

A. 1. Overview of Ink Jet Printer

Figure 1:
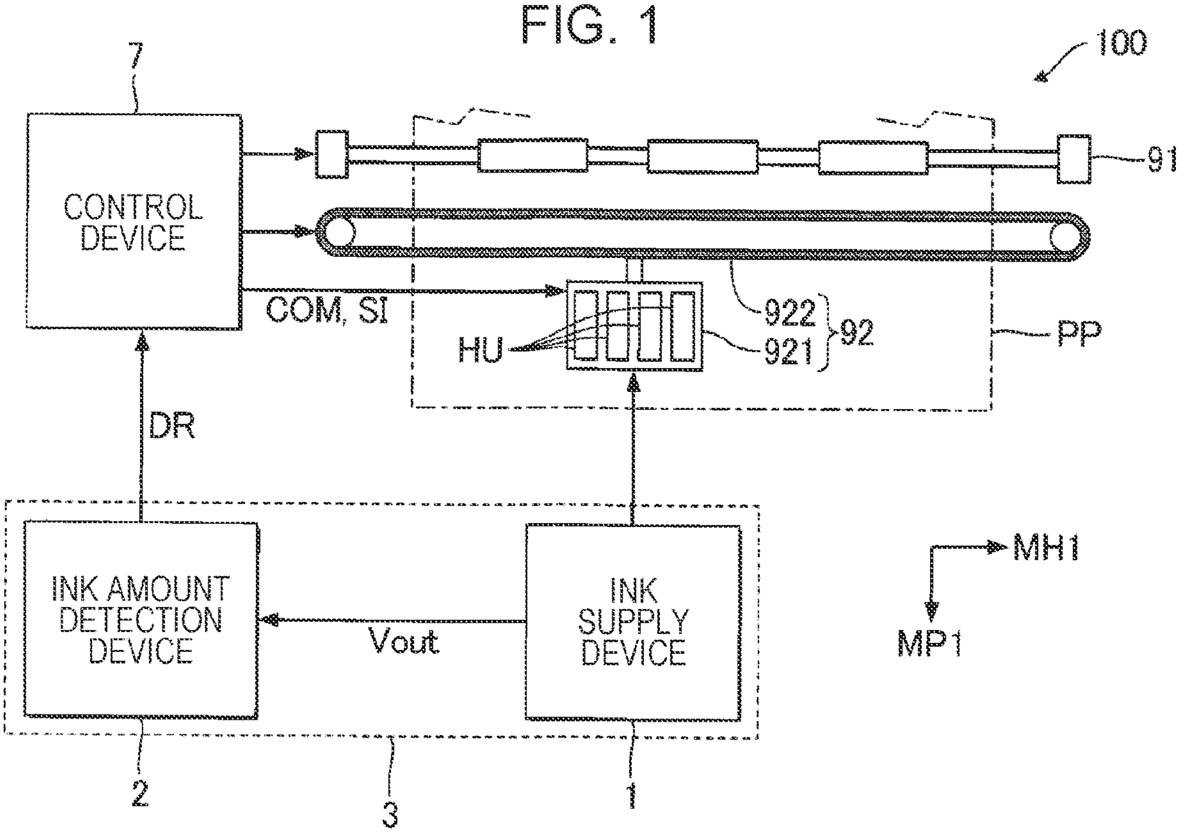
FIG. 1 is an explanatory diagram for explaining an example of an ink jet printer according to an embodiment of the present disclosure.

FIG. 1 is an explanatory diagram for explaining an example of an ink jet printer 100 according to the embodiment of the present disclosure.

The ink jet printer 100 is an ink jet printing apparatus that discharges ink IK onto a medium PP. The medium PP is typically printing paper, but any printing target, such as a resin film or fabric, can be used as the medium PP. In the present embodiment, the ink jet printer 100 is an example of a "liquid discharge apparatus", and the ink IK is an example of a "liquid" and an "object".

The ink jet printer 100 has, for example, a storage device 3 including an ink supply device 1 and an ink amount detection device 2, a control device 7, a plurality of liquid discharge heads HU, a movement mechanism 91, and a transport mechanism 92.

The control device 7 includes, for example, a processing circuit such as a CPU or FPGA and a storage circuit such as a semiconductor memory, and controls each element of the ink jet printer 100. Here, the CPU is an abbreviation for a central processing unit, and the FPGA is an abbreviation for a field programmable gate array.

The movement mechanism 91 transports the medium PP in a sub scanning direction MP1 based on the control by the control device 7. The transport mechanism 92 reciprocates the plurality of liquid discharge heads HU along a main scanning direction MH1 intersecting the sub scanning direction MP1 based on the control by the control device 7. The transport mechanism 92 has a storage case 921 that accommodates the plurality of liquid discharge heads HU, and an endless belt 922 to which the storage case 921 is fixed. The storage device 3 may be accommodated in the storage case 921 together with the liquid discharge head HU.

The control device 7 supplies a drive signal COM for driving the liquid discharge head HU and a control signal SI for controlling the liquid discharge head HU to the liquid discharge head HU. Then, the liquid discharge head HU discharges the ink IK from some or all of a plurality of nozzles provided in the liquid discharge head HU based on the control signal SI and the driving signal COM. That is, the liquid discharge head HU causes the ink IK to be discharged from some or all of the plurality of nozzles in conjunction with the transportation of the medium PP by the movement mechanism 91 and the reciprocation of the liquid discharge head HU by the transport mechanism 92, and causes the discharged ink to land on a surface of the medium PP. As a result, a desired image is formed at a surface of the medium PP. In the present embodiment, the liquid discharge head HU is an example of a "discharging section".

The ink supply device 1 included in the storage device 3 stores the ink IK. In addition, the ink supply device 1 supplies the ink IK stored in the ink supply device 1 to the liquid discharge head HU, based on the control by the control device 7. In the present embodiment, it is assumed that the ink supply device 1 stores M types of the ink IK. Here, a value M is a natural number that satisfies 1≤M. More specifically, in the present embodiment, as an example, it is assumed that the ink supply device 1 stores four types of the ink IK corresponding to cyan, magenta, yellow, and black. That is, in the present embodiment, as an example, "M=4" is assumed. In addition, in the present embodiment, as an example, it is assumed that the ink jet printer 100 has four liquid discharge heads HU corresponding to four types of the ink IK.

The ink amount detection device 2 included in the storage device 3 detects the remaining amount of the ink IK stored in the ink supply device 1 based on a detection signal Vout detected from the ink supply device 1. Then, the ink amount detection device 2 outputs ink amount information DR indicating a detection result of the remaining amount of the ink IK to the control device 7. The detection signal Vout and the ink amount information DR will be described later with reference to FIG. 8.

Next, an overview of the ink supply device 1 will be explained with reference to FIGS. 2 and 3.

A. 2. Overview of Ink Supply Device

Figure 2:
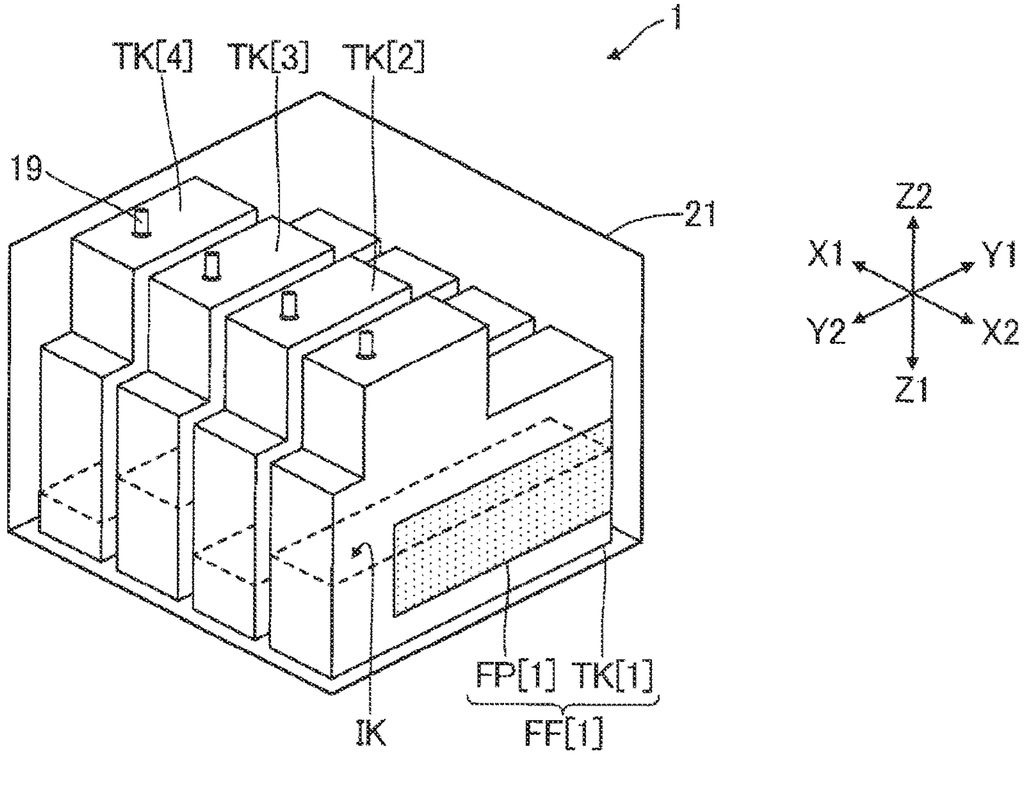
FIG. 2 is a perspective view showing an example of a configuration of an ink supply device.

FIG. 2 is a perspective view showing an example of a configuration of the ink supply device 1.

The ink supply device 1 has M ink tanks TK[1] to TK[M] corresponding one-to-one with M types of ink IK stored in the ink supply device 1 and M flexible printed substrates FP[1] to FP[M] corresponding one-to-one with the M ink tanks TK[1] to TK[M]. Further, the ink supply device 1 has a storage case 21 for accommodating the M ink tanks TK[1] to TK[M] and the M flexible printed substrates FP[1] to FP[M]. That is, in the present embodiment, the ink supply device 1 has four ink tanks TK[1] to TK[4] corresponding one-to-one with four types of ink IK of cyan, magenta, yellow, and black, and four flexible printed substrates FP[1] to FP[4] corresponding one-to-one with the four ink tanks TK[1] to TK[4].

In the ink tank TK[m], a supply port 19 for supplying the ink IK to an internal space of the ink tank TK[m] is provided. In addition, the flexible printed substrate FP[m] is fixed to the ink tank TK[m]. Here, the variable m is a natural number that satisfies 1≤m≤M. In the following, a component including the ink tank TK[m] and the flexible printed substrate FP[m] may be referred to as an ink management device FF[m]. That is, the ink supply device 1 has M ink management devices FF[m] corresponding one-to-one with M types of ink IK stored in the ink supply device 1. In addition, in the following, the liquid discharge head HU that discharges the ink IK supplied from the ink tank TK[m] provided in the ink management device FF[m] may be referred to as a liquid discharge head HU[m].

In the present embodiment, it is assumed that M ink tanks TK[1] to TK[M] are disposed along an X axis in the ink supply device 1. In the following, as shown in FIG. 2, one direction along the X axis is also referred to as an X1 direction, and a direction opposite to the X1 direction is also referred to as an X2 direction. Similarly, one direction along a Y axis orthogonal to the X axis is also referred to as a Y1 direction, and a direction opposite to the Y1 direction is also referred to as a Y2 direction. In addition, one direction along a Z axis orthogonal to the X axis and the Y axis is also referred to as a Z1 direction, and a direction opposite to the Z1 direction is also referred to as a Z2 direction. Further, in the following, the X1 direction and the X2 direction may be collectively referred to as an X axis direction, the Y1 direction and the Y2 direction may be collectively referred to as a Y axis direction, and the Z1 direction and the Z2 direction may be collectively referred to as a Z axis direction. In the present embodiment, it is assumed that the X axis, the Y axis, and the Z axis are orthogonal to each other, but the present disclosure is not limited to such an aspect. For example, the X axis, the Y axis, and the Z axis may intersect each other.

In addition, in the present embodiment, it is assumed that a direction in which the ink IK decreases is the Z1 direction when the ink IK is supplied from the ink tank TK[m] to the liquid discharge head HU[m] and the ink IK stored inside the ink tank TK[m] decreases. In the present embodiment, the X1 direction is an example of a "first direction".

Figure 3:
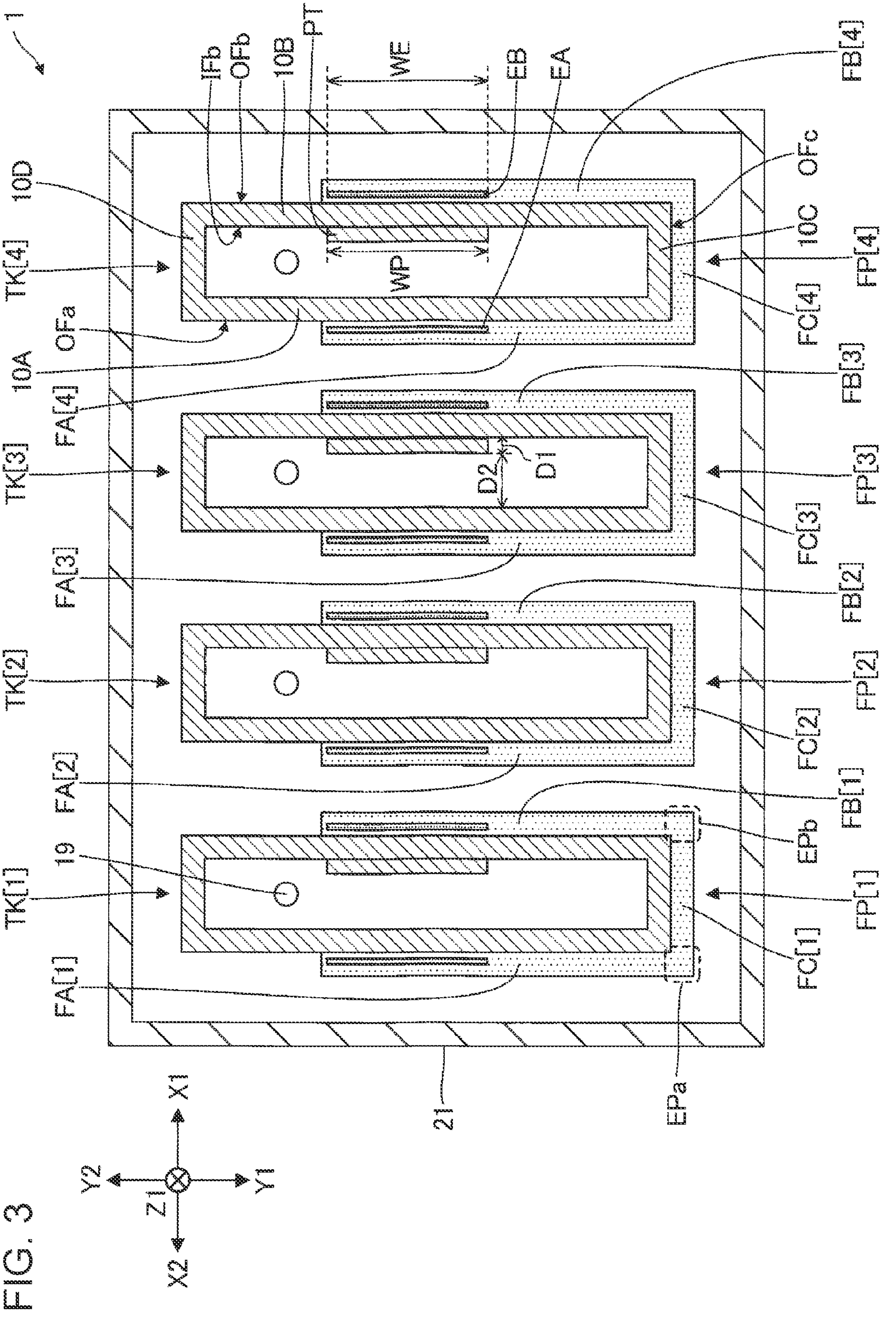
FIG. 3 is a plan view showing an example of a configuration of the ink supply device.

FIG. 3 is a plan view showing an example of a configuration of the ink supply device 1. FIG. 3 shows a plan view of the ink supply device 1 when the ink supply device 1 is viewed from the Z2 direction to the Z1 direction.

As shown in FIG. 3, in the present embodiment, it is assumed that an ink tank TK[2] is provided in the X1 direction when viewed from the ink tank TK[1], an ink tank TK[3] is provided in the X1 direction when viewed from the ink tank TK[2], and an ink tank TK[4] is provided in the X1 direction when viewed from the ink tank TK[3], in the ink supply device 1.

Figure 6:
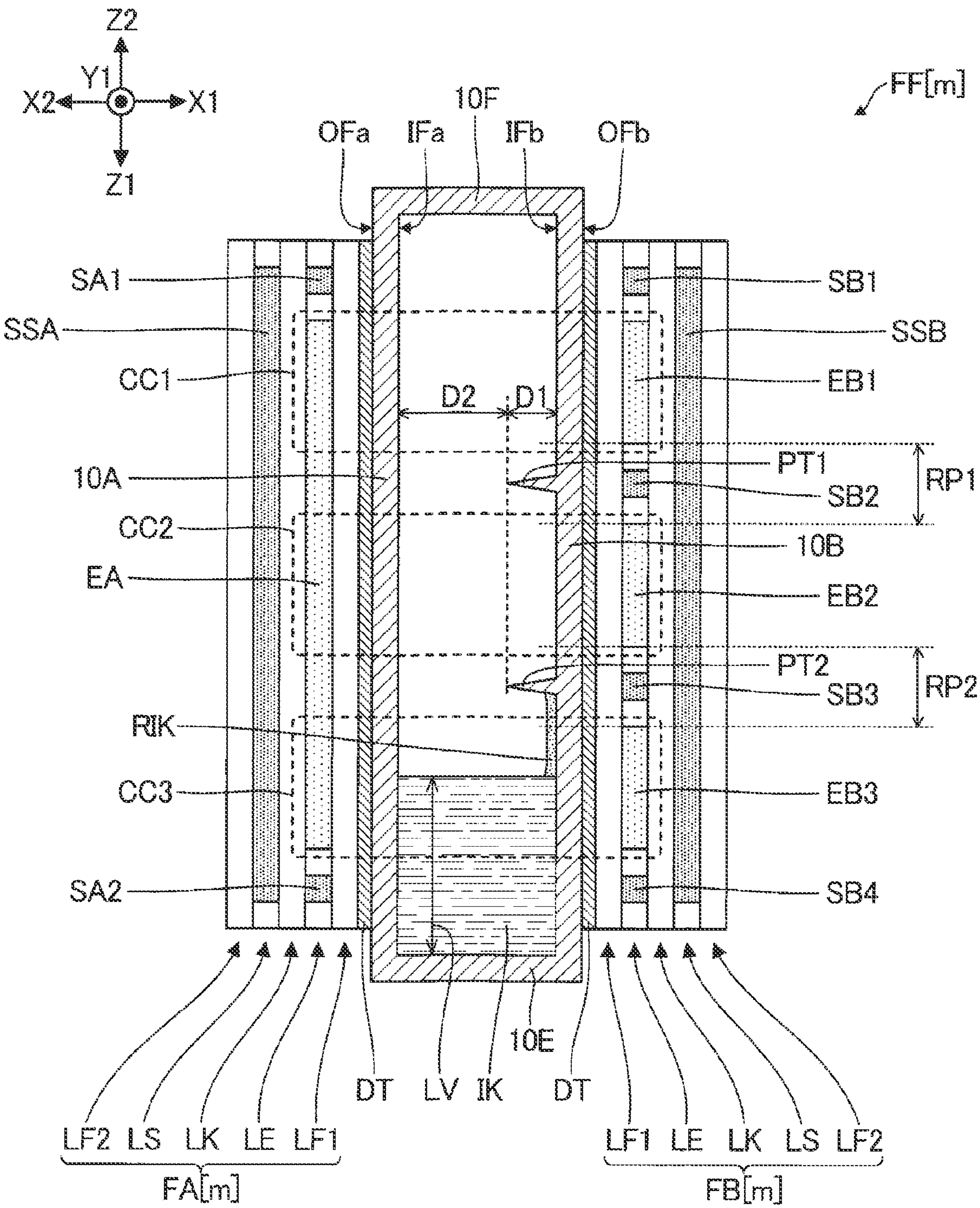
FIG. 6 is a cross-sectional view showing an example of a configuration of the ink management device.

For example, the ink tank TK[m] has a plurality of walls 10, and stores the ink IK in a space surrounded by the plurality of walls 10. In FIG. 3 and FIG. 6, which will be described later, the alphabet "A", "B", "C", "D", "E", or "F" is added at the end of the reference sign of each of the walls 10 in order to distinguish the plurality of walls 10 from each other. That is, in the present embodiment, it is assumed that the plurality of walls 10 include walls 10A, 10B, 10C, 10D, 10E, and 10F. In the following, it is assumed that the walls 10A and 10B are the walls 10 provided along a plane having the X1 direction as a normal direction, and the walls 10C and 10D are the walls 10 provided along a plane having the Y1 direction as a normal direction. In addition, in the following, it is assumed that the walls 10E and 10F shown in FIG. 6, which will be described later, are the walls 10 provided along a plane having the Z1 direction as a normal direction.

In addition, in the present embodiment, as described above, it is assumed that the flexible printed substrate FP[m] is attached to the ink tank TK[m]. Specifically, in the present embodiment, it is assumed that the flexible printed substrate FP[m] is fixed to the wall 10A, the wall 10C, and the wall 10B among the plurality of walls 10 of the ink tank TK[m]. For example, the flexible printed substrate FP[m] is bent along an outer surface OFa of the wall 10A and an outer surface OFc of the wall 10C in a bent portion EPa, and is bent along an outer surface OFb of the wall 10B and the outer surface OFc of the wall 10C in a bent portion EPb. Accordingly, the flexible printed substrate FP[m] is provided to be in contact with the outer surface OFa of the wall 10A, the outer surface OFb of the wall 10B, and the outer surface OFc of the wall 10C. The outer surface OFa of the wall 10A is a wall surface outside the ink tank TK[m] of the wall 10A, and the outer surface OFb of the wall 10B is a wall surface outside the ink tank TK[m] of the wall 10B. Similarly, the outer surface OFb of the wall 10C is a wall surface outside the ink tank TK[m] of the wall 10C.

In the following, a portion of the flexible printed substrate FP[m] provided on the wall 10A is referred to as a wiring portion FA[m], a portion of the flexible printed substrate FP[m] provided on the wall 10B is referred to as a wiring portion FB[m], and a portion of the flexible printed substrate FP[m] provided on the wall 10C is referred to as a wiring portion FC[m].

The details will be described later in FIG. 4 and thereafter, but for example, the wiring portion FA[m] includes the input electrode EA or the like, and the wiring portion FB[m] includes a plurality of detection electrodes EB disposed along the Z1 direction. In FIG. 3, a detection electrode EB located closest in the Z2 direction among the plurality of detection electrodes EB is shown. The details of elements included in the flexible printed substrate FP[m] will be described later with reference to FIG. 6.

In addition, in the present embodiment, a plurality of protrusion portions PT are provided on an inner surface IFb of the wall 10B opposite to the outer surface OFb. For example, the protrusion portion PT is located between the plurality of detection electrodes EB in the Z1 direction. In addition, the protrusion portion PT extends, for example, along the Y1 direction and protrudes from the inner surface IFb of the wall 10B in the X2 direction. It is preferable that a width WP of the protrusion portion PT along the Y direction is equal to or larger than a width WE of the detection electrode EB along the Y direction, and it is preferable that a length D1 of the protrusion portion PT along the X direction is smaller than an interval D2 between the protrusion portion PT and the wall 10B in the X direction.

The ink tank TK[m] is an example of a "storage section". In addition, the wall 10B is an example of a "first wall", the outer surface OFb of the wall 10B is an example of a "first surface", and the inner surface IFb of the wall 10B is an example of a "second surface". In addition, the wall 10A is an example of a "second wall".

Next, an overview of the ink supply device 1 will be explained, focusing on an overview of the flexible printed substrate FP[m], with reference to FIGS. 4 to 7.

A. 3. Overview of Flexible Printed Substrate

Figure 4:
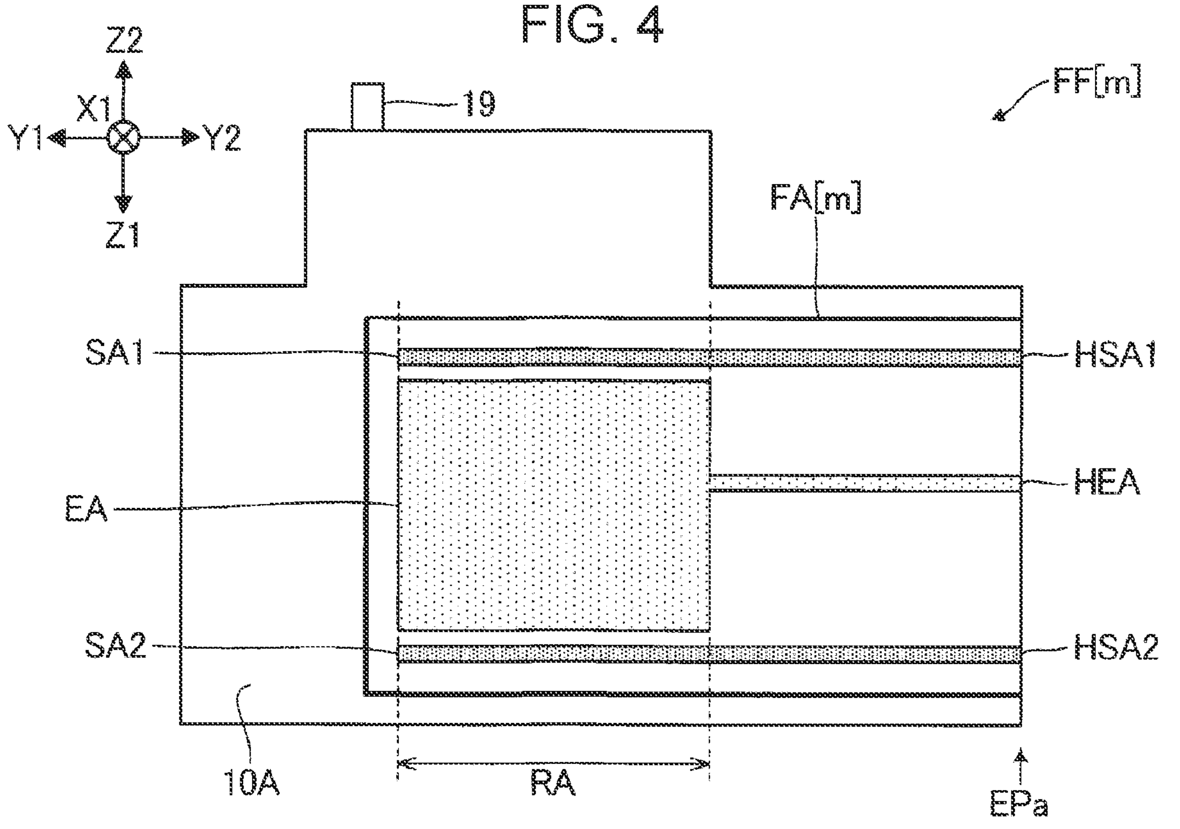
FIG. 4 is a plan view showing an example of a configuration of an ink management device.

FIG. 4 is a plan view showing an example of a configuration of the ink supply device 1. FIG. 4 is a plan view of the wiring portion FA[m] observed when the ink management device FF[m] is viewed from the X2 direction to the X1 direction. In addition, only the main portion of the wiring portion FA[m] is transparently shown in FIG. 4.

The wiring portion FA[m] includes a conductive input electrode EA provided in an electrode forming region RA. Further, the wiring portion FA[m] includes a conductive shield electrode SA1 provided at a position in the Z2 direction as viewed from the input electrode EA in the electrode forming region RA, and a conductive shield electrode SA2 provided at a position in the Z1 direction as viewed from the input electrode EA in the electrode forming region RA.

In addition, the wiring portion FA[m] includes a conductive coupling wiring HEA coupled to the input electrode EA, a conductive coupling wiring HSA1 coupled to the shield electrode SA1, and a conductive coupling wiring HSA2 coupled to the shield electrode SA2. The coupling wiring HEA is provided between the electrode forming region RA and the bent portion EPa. In addition, the coupling wiring HSA1 is provided between the electrode forming region RA and the bent portion EPa at a position in the Z2 direction as viewed from the coupling wiring HEA, and the coupling wiring HSA2 is provided between the electrode forming region RA and the bent portion EPa at a position in the Z1 direction as viewed from the coupling wiring HEA.

Figure 5:
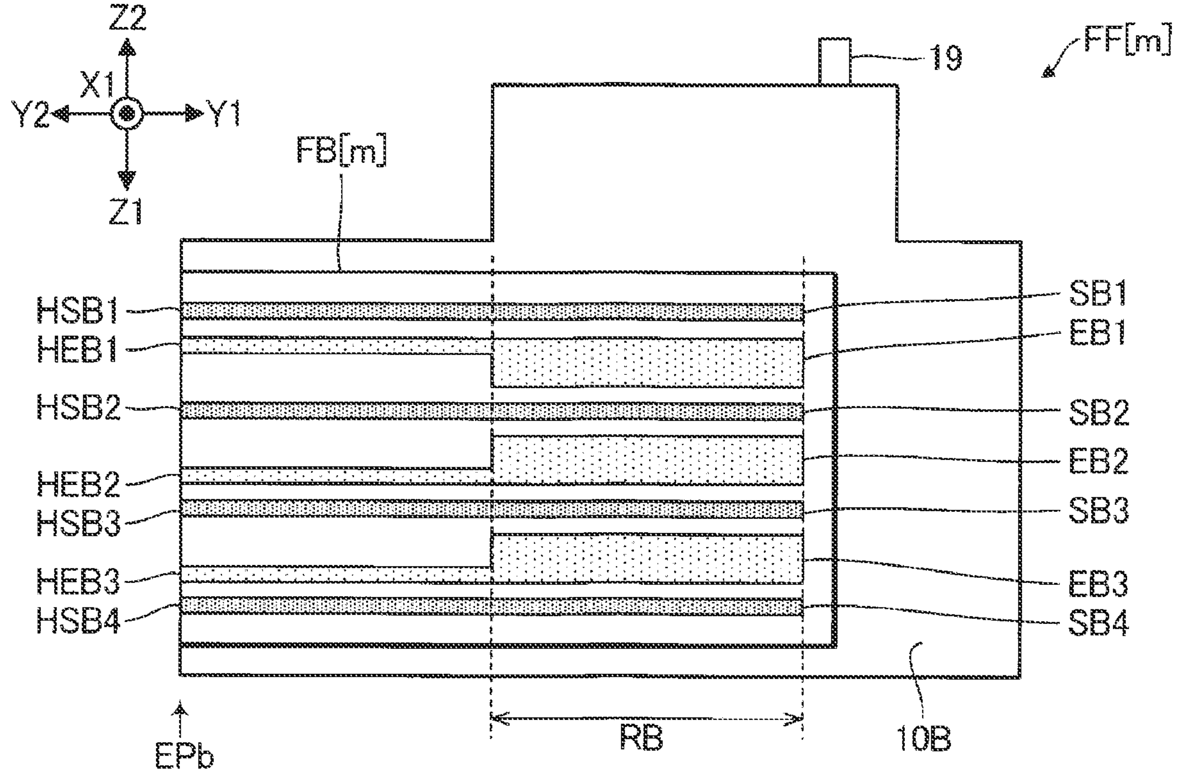
FIG. 5 is a plan view showing an example of a configuration of the ink management device.

FIG. 5 is a plan view showing an example of a configuration of the ink supply device 1. FIG. 5 is a plan view of the wiring portion FB[m] observed when the ink management device FF[m] is viewed from the X1 direction to the X2 direction. In addition, only the main portion of the wiring portion FB[m] is transparently shown in FIG. 5. In addition, in FIG. 5, the number "1", "2", or "3" is added to the end of the reference sign of the detection electrode EB in order to distinguish the plurality of detection electrodes EB from each other.

The wiring portion FB[m] includes the plurality of conductive detection electrodes EB1, EB2, and EB3 provided in the electrode forming region RB and the plurality of conductive shield electrodes SB1, SB2, SB3, and SB4 provided in the electrode forming region RB. The detection electrode EB2 is provided at a position in the Z1 direction as viewed from the detection electrode EB1 in the electrode forming region RB, and the detection electrode EB3 is provided at a position in the Z1 direction as viewed from the detection electrode EB2 in the electrode forming region RB. The shield electrode SB1 is provided at a position in the Z2 direction as viewed from the detection electrode EB1, and the shield electrode SB2 is provided between the detection electrodes EB1 and EB2. In addition, the shield electrode SB3 is provided between the detection electrodes EB2 and EB3, and the shield electrode SB4 is provided at a position in the Z1 direction as viewed from the detection electrode EB3.

One of the detection electrodes EB1 and EB2 is an example of a "first electrode", and the other of the detection electrodes EB1 and EB2 is an example of a "second electrode". In addition, one of the detection electrodes EB2 and EB3 is an example of a "first electrode", and the other of the detection electrodes EB2 and EB3 is an example of a "second electrode".

In addition, the wiring portion FB[m] includes a conductive coupling wiring HEB1 coupled to the detection electrode EB1, a conductive coupling wiring HEB2 coupled to the detection electrode EB2, and a conductive coupling wiring HEB3 coupled to the detection electrode EB3. The coupling wiring HEB1 is provided between the electrode forming region RB and the bent portion EPb. The coupling wiring HEB2 is provided between the electrode forming region RB and the bent portion EPb at a position in the Z1 direction as viewed from the coupling wiring HEB1, and the coupling wiring HEB3 is provided between the electrode forming region RB and the bent portion EPb at a position in the Z1 direction as viewed from the coupling wiring HEB2.

Further, the wiring portion FB[m] includes a conductive coupling wiring HSB1 coupled to the shield electrode SB1, a conductive coupling wiring HSB2 coupled to the shield electrode SB2, a conductive coupling wiring HSB3 coupled to the shield electrode SB3, and a conductive coupling wiring HSB4 coupled to the shield electrode SB4. The coupling wiring HSB1 is provided between the electrode forming region RB and the bent portion EPb at a position in the Z2 direction as viewed from the coupling wiring HEB1, and the coupling wiring HSB2 is provided between the electrode forming region RB and the bent portion EPb and is provided between the coupling wiring HEB1 and HEB2. The coupling wiring HSB3 is provided between the electrode forming region RB and the bent portion EPb and is provided between the coupling wiring HEB2 and HEB3, and the coupling wiring HSB4 is provided between the electrode forming region RB and the bent portion EPb at a position in the Z1 direction as viewed from the coupling wiring HEB3.

In the present embodiment, when the ink management device FF[m] is viewed from one of the X1 direction and the X2 direction toward the other, a region overlapping the electrode forming region RA in the wiring portion FB[m] is a region substantially the same as the electrode forming region RB. That is, in the present embodiment, when the ink management device FF[m] is viewed from one of the X1 direction and the X2 direction toward the other, the electrode forming region RA and the electrode forming region RB substantially coincide with each other. Here, "substantially the same" is a concept including not only a case of being completely the same but also a case of being considered to be the same in consideration of errors. In the present embodiment, "substantially the same" is a concept including a case of being considered to be the same when an error of about 10% is considered. "Substantially coincide" is the same as "substantially the same".

In addition, in the present embodiment, it is assumed that a width of the detection electrode EB1 in the Z1 direction, a width of the detection electrode EB2 in the Z1 direction, and a width of the detection electrode EB3 in the Z1 direction are substantially the same. Incidentally, the width of the detection electrode EB1 in the Z1 direction, the width of the detection electrode EB2 in the Z1 direction, and the width of the detection electrode EB3 in the Z1 direction may not be substantially the same. For example, the width of the detection electrode EB2 in the Z1 direction may be larger than the width of the detection electrode EB1 in the Z1 direction and may be larger than the width of the detection electrode EB3 in the Z1 direction.

FIG. 6 is a cross-sectional view showing an example of a configuration of the ink management device FF[m].

The flexible printed substrate FP[m] is fixed to the walls 10A, 10B, and 10C by a double-sided adhesive tape DT. The flexible printed substrate FP[m] has a non-conductive cover film layer LF1 adhering to the double-sided adhesive tape DT, a non-conductive cover film layer LF2, and a non-conductive base material layer LK that is provided between the cover film layers LF1 and LF2.

Further, the flexible printed substrate FP[m] includes a conductive wiring layer LE provided between the base material layer LK and the cover film layer LF1, and a conductive shield layer LS provided between the base material layer LK and the cover film layer LF2. The input electrode EA, the shield electrodes SA1 and SA2, the detection electrodes EB1, EB2, and EB3, and the shield electrodes SB1, SB2, SB3, and SB4 are disposed on the wiring layer LE, and the shield electrodes SSA and SSB are disposed on the shield layer LS.

In the wiring layer LE, non-conductive partition walls are provided between the input electrode EA and the shield electrode SA1, and between the input electrode EA and the shield electrode SA2. In addition, in the wiring layer LE, non-conductive partition walls are provided between the detection electrode EB1 and the shield electrode SB1, between the detection electrode EB1 and the shield electrode SB2, between the detection electrode EB2 and the shield electrode SB2, between the detection electrode EB2 and the shield electrode SB3, between the detection electrode EB3 and the shield electrode SB3, and between the detection electrode EB3 and the shield electrode SB4.

In addition, the shield electrode SSA is provided so that the shield electrode SSA covers the entire input electrode EA when the wiring portion FA[m] is viewed from the X2 direction to the X1 direction. In addition, the shield electrode SSB is provided so that the shield electrode SSB covers all of the detection electrodes EB1, EB2, and EB3 when the wiring portion FB[m] is viewed from the X1 direction to the X2 direction.

In the present embodiment, the shield electrodes SSA and SSB are provided so that a thickness of the shield electrode SSA in the X1 direction and a thickness of the shield electrode SSB in the X1 direction are substantially the same. In addition, in the present embodiment, the wiring portion FA[m] and the wiring portion FB[m] are provided so that a thickness of the wiring portion FA[m] in the X1 direction and a thickness of the wiring portion FB[m] in the X1 direction are substantially the same.

Here, a capacitor CC1 is formed between the input electrode EA and the detection electrode EB1, a capacitor CC2 is formed between the input electrode EA and the detection electrode EB2, and a capacitor CC3 is formed between the input electrode EA and the detection electrode EB3. The capacity values of the capacitors CC1, CC2, and CC3 are determined according to the remaining amount of the ink IK stored in the ink tank TK[m]. In the following, a distance from the wall 10E, which is a bottom surface of the ink tank TK[m], to the liquid level of the ink IK stored in the ink tank TK[m] is referred to as a liquid level height LV. In addition, in the following, the capacitors CC1, CC2 and CC3 may be collectively referred to as a capacitor CC.

In addition, in the present embodiment, the protrusion portion PT is provided on each of a specific portion RP1 between the detection electrodes EB1 and EB2 and a specific portion RP2 between the detection electrodes EB2 and EB3 in the wall 10B where the detection electrodes EB1, EB2 and EB3 are provided. In FIG. 6, the number "1" or "2" is added to the end of the reference sign of the protrusion portion PT in order to distinguish the plurality of protrusion portions PT from each other. For example, a protrusion portion PT1 is located between the detection electrodes EB1 and EB2 in the Z1 direction, and a protrusion portion PT2 is located between the detection electrodes EB2 and EB3 in the Z1 direction.

The protrusion portions PT1 and PT2 are respectively provided in the specific portions RP1 and RP2, for example, to separate the liquid residue of the ink IK adhering to the inner surface IFb of the wall 10B. In the following, the liquid residue of the ink IK adhering to the inner surface IFa of the wall 10A and the liquid residue of the ink IK adhering to the inner surface IFb of the wall 10B are also referred to as a non-detection material RIK.

For example, the protrusion portion PT1 is provided in the specific portion RP1 so that the non-detection material RIK does not continuously adhere to the inner surface IFb of the wall 10B from the detection electrode EB1 to the detection electrode EB2. Similarly, the protrusion portion PT2 is provided in the specific portion RP2 so that the non-detection material RIK does not continuously adhere to the inner surface IFb of the wall 10B from the detection electrode EB2 to the detection electrode EB3. The amount of protrusion of the protrusion portion PT in the X2 direction, that is, a length D1 of the protrusion portion PT along the X direction is not particularly limited, but is preferably long enough to separate the non-detection material RIK. Further, it is preferable that the length D1 of the protrusion portion PT along the X direction is determined so that the interval D2 between the protrusion portion PT and the wall 10B in the X direction is ensured so that the ink IK can flow smoothly when the ink IK stored inside the ink tank TK [m] decreases.

As described above, in the present embodiment, the protrusion portion PT can suppress the non-detection material RIK from continuously adhering to the inner surface IFb of the wall 10B from the detection electrode EB1 to the detection electrode EB2. Accordingly, in the present embodiment, it is possible to suppress the capacity value of the capacitor CC from changing due to the influence of the non-detection material RIK. As a result, in the present embodiment, it is possible to accurately detect the remaining amount of the ink IK stored inside the ink tank TK[m].

A shape of the protrusion portion PT is not particularly limited. For example, the shape of the protrusion portion PT that is grasped when the protrusion portion PT is viewed from the Y1 direction to the Y2 direction may be a triangular shape as shown in FIG. 6. Alternatively, the shape of the protrusion portion PT that is grasped when the protrusion portion PT is viewed from the Y1 direction to the Y2 direction may be a rectangular shape. In addition, the method for forming the protrusion portion PT is not particularly limited. For example, the protrusion portion PT may be formed of the same material as the wall 10B and may be integrally formed with the wall 10B. Alternatively, the protrusion portion PT may be formed of the same material or a different material as the wall 10B and may adhere to the wall 10B.

Figure 7:
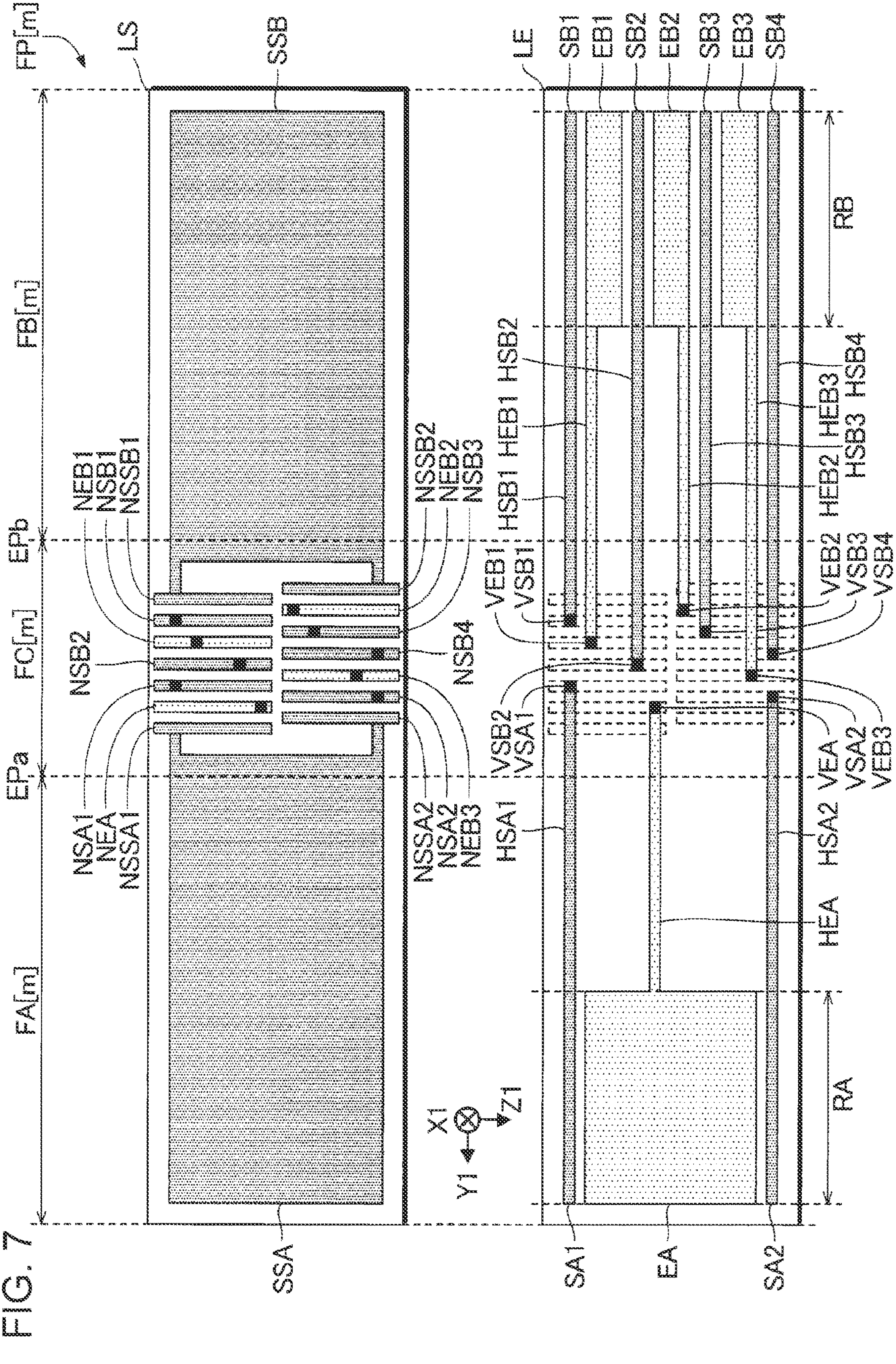
FIG. 7 is a plan view showing an example of a configuration of a flexible printed substrate.

FIG. 7 is a plan view showing an example of a configuration of the flexible printed substrate FP[m]. FIG. 7 is a development view when the flexible printed substrate FP[m] is removed from the ink tank TK[m] and developed in a plan shape. In addition, in FIG. 7, the X axis, the Y axis, and the Z axis are displayed assuming a case where the flexible printed substrate FP[m] is developed such that the wiring portion FC[m] and the wiring portion FB[m] are located on the same plane as the wiring portion FA[m] without changing the position and the posture of the wiring portion FA[m] from the position and the posture in FIG. 4. In addition, in FIG. 7, in the flexible printed substrate FP[m], only the wiring layer LE and the shield layer LS are shown, and the base material layer LK, the cover film layer LF1, and the cover film layer LF2 are not shown.

In the flexible printed substrate FP[m], the wiring layer LE has a through electrode VEA, through electrodes VSA1 and VSA2, through electrodes VEB1, VEB2, and VEB3, and through electrodes VSB1, VSB2, VSB3, and VSB4 in the wiring portion FC[m]. In addition, in the flexible printed substrate FP[m], the shield layer LS has a terminal NEA, terminals NSA1 and NSA2, terminals NEB1, NEB2, and NEB3, and terminals NSB1, NSB2, NSB3 and NSB4. Further, the shield layer LS has terminals NSSA1 and NSSA2 coupled to the shield electrode SSA, and terminals NSSB1 and NSSB2 coupled to the shield electrode SSB.

The through electrode VEA is coupled to the coupling wiring HEA and is coupled to the terminal NEA through a through-hole provided in the base material layer LK. The through electrode VSA1 is coupled to the coupling wiring HSA1 and is coupled to the terminal NSA1 through the through-hole provided in the base material layer LK. The through electrode VSA2 is coupled to the coupling wiring HSA2 and is coupled to the terminal NSA2 through the through-hole provided in the base material layer LK. The through electrode VEB1 is coupled to the coupling wiring HEB1 and is coupled to the terminal NEB1 through the through-hole provided in the base material layer LK. The through electrode VEB2 is coupled to the coupling wiring HEB2 and is coupled to the terminal NEB2 through the through-hole provided in the base material layer LK. The through electrode VEB3 is coupled to the coupling wiring HEB3 and is coupled to the terminal NEB3 through the through-hole provided in the base material layer LK. The through electrode VSB1 is coupled to the coupling wiring HSB1 and is coupled to the terminal NSB1 through the through-hole provided in the base material layer LK. The through electrode VSB2 is coupled to the coupling wiring HSB2 and is coupled to the terminal NSB2 through the through-hole provided in the base material layer LK. The through electrode VSB3 is coupled to the coupling wiring HSB3 and is coupled to the terminal NSB3 through the through-hole provided in the base material layer LK. The through electrode VSB4 is coupled to the coupling wiring HSB4 and is coupled to the terminal NSB4 through the through-hole provided in the base material layer LK.

Next, an overview of the ink amount detection device 2 will be explained with reference to FIGS. 8 and 9.

A. 4. Overview of Ink Amount Detection Device

Figure 8:
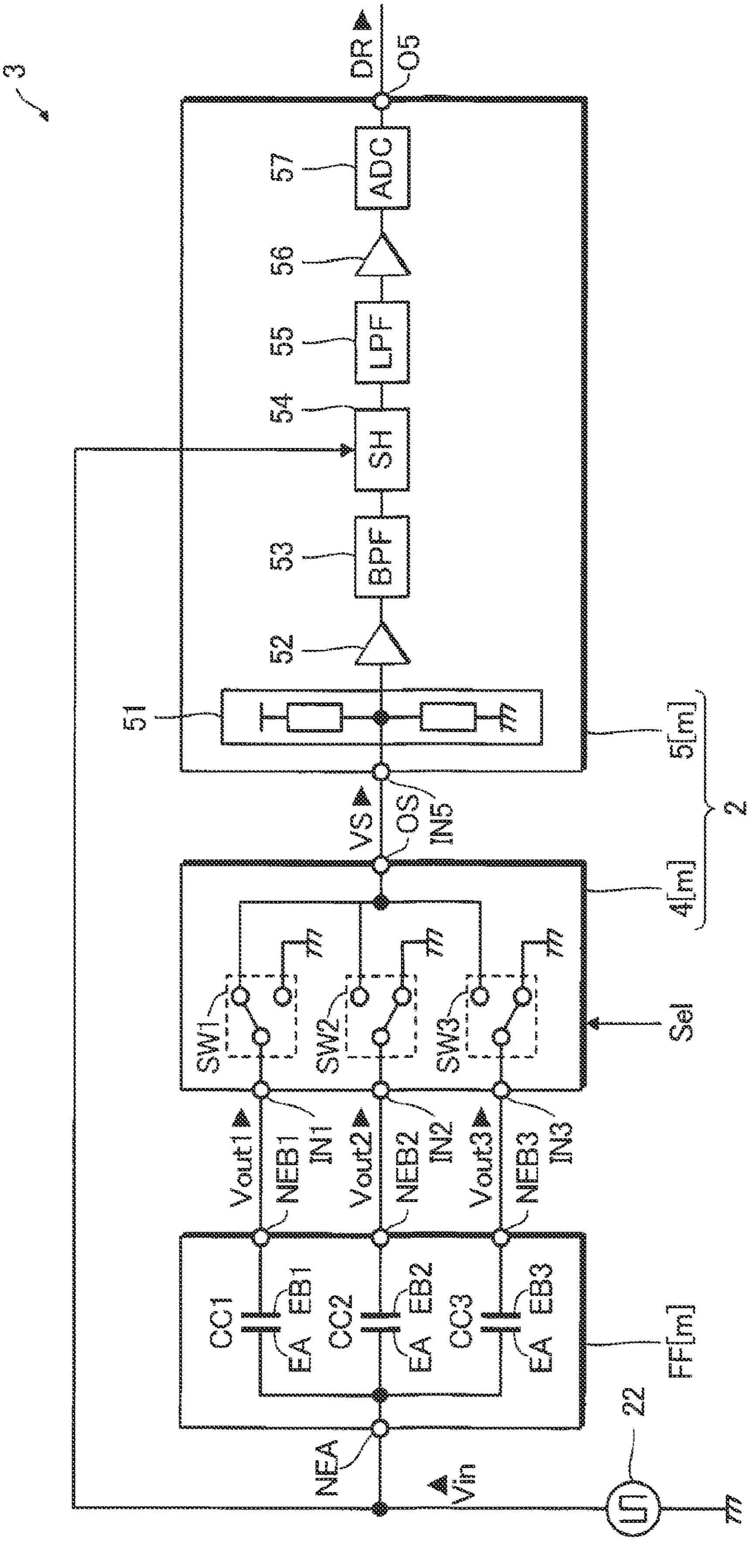
FIG. 8 is a block diagram showing an example of a configuration of a storage device.

FIG. 8 is a block diagram showing an example of a configuration of the storage device 3. In FIG. 8, a block diagram for explaining a configuration of the storage device 3 including the ink supply device 1 and the ink amount detection device 2 is shown.

As described above, the storage device 3 has the ink supply device 1 including the ink management device FF[m] and the ink amount detection device 2. The ink amount detection device 2 has M selection circuits 4 corresponding one-to-one with M ink management devices FF[1] to FF[M] included in the ink supply device 1, and M ink amount information generation circuits 5 corresponding one-to-one with M ink management devices FF[1] to FF[M] included in the ink supply device 1. For convenience of explanation, FIG. 8 shows only one ink management device FF[m] among the M ink management devices FF[1] to FF[M] included in the ink supply device 1. Similarly, FIG. 8 shows a selection circuit 4[*m*] corresponding to the ink management device FF[m] and an ink amount information generation circuit 5[*m*] corresponding to the ink management device FF[m] among M selection circuits 4 and M ink amount information generation circuits 5 included in the ink amount detection device 2. In addition, for convenience of explanation, FIG. 8 shows the ink management device FF[m] as an equivalent circuit of the ink management device FF[m] using the capacitors CC1, CC2, and CC3 which are provided in the ink management device FF[m].

The terminal NEA of the ink management device FF[m] is electrically coupled to an AC power supply 22. The AC power supply 22 supplies an input signal Vin, which is an AC pulse signal, to the terminal NEA. Then, the input signal Vin input to the terminal NEA of the ink management device FF[m] is transmitted as a detection signal Vout1 to the terminal NEB1 through the capacitor CC1, is transmitted as a detection signal Vout2 to the terminal NEB2 through the capacitor CC2, and is transmitted as a detection signal Vout3 to the terminal NEB3 through the capacitor CC3. In the present embodiment, the detection signals Vout1, Vout2, and Vout3 are collectively referred to as a detection signal Vout in some cases.

The selection circuit 4[*m*] has input terminals IN1, IN2, and IN3, an output terminal OS, and switches SW1, SW2, and SW3.

The input terminal IN1 is electrically coupled to the terminal NEB1. In the input terminal IN1, the detection signal Vout1 transmitted to the terminal NEB1 is supplied. The input terminal IN2 is electrically coupled to the terminal NEB2. In the input terminal IN2, the detection signal Vout2 transmitted to the terminal NEB2 is supplied. The input terminal IN3 is electrically coupled to the terminal NEB3. The input terminal IN3, the detection signal Vout3 transmitted to the terminal NEB3 is supplied.

In addition, the switch SW1 switches whether or not to electrically couple the input terminal IN1 and the output terminal OS, based on a selection signal Se1 supplied from the control device 7. The switch SW2 switches whether or not to electrically couple the input terminal IN2 and the output terminal OS, based on the selection signal Se1 supplied from the control device 7. The switch SW3 switches whether or not to electrically couple the input terminal IN3 and the output terminal OS, based on the selection signal Se1 supplied from the control device 7.

Specifically, the selection circuit 4[*m*] electrically couples one input terminal IN selected by the selection signal Se1 among the input terminals IN1, IN2, and IN3 to the output terminal OS based on the selection signal Se1. In addition, the selection circuit 4[*m*] grounds two input terminals IN among the input terminals IN1, IN2, and IN3 except one input terminal IN selected by the selection signal Se1, that is, the input terminal IN unselected by the selection signal Se1. Accordingly, one input terminal IN selected by the selection signal Se1 among the input terminals IN1, IN2, and IN3 is electrically coupled to the output terminal OS, and two input terminals IN except the one input terminal IN are electrically separated from the output terminal OS. In addition, the selection circuit 4[*m*] outputs the detection signal Vout, which is input to one input terminal IN selected by the selection signal Se1, among the detection signals Vout1, Vout2, and Vout3 input to the selection circuit 4[*m*], from the output terminal OS as an output signal VS.

The ink amount information generation circuit 5[*m*] has an input terminal IN5, an output terminal O5, a bias circuit 51, a buffer circuit 52, a band pass filter 53, a sample hold circuit 54, a low pass filter 55, an amplification circuit 56, and an analog-to-digital conversion circuit 57.

The input terminal IN5 is electrically coupled to the output terminal OS. The detection signal Vout selected by the selection circuit 4[*m*] is supplied from the output terminal OS of the selection circuit 4[*m*] to the input terminal IN5 as the output signal VS. The input terminal IN5 is electrically coupled to the input terminal of the buffer circuit 52 through the bias circuit 51.

The bias circuit 51 biases the output signal VS supplied to the input terminal IN5 to a predetermined bias voltage between a power supply voltage and a ground voltage. The buffer circuit 52 outputs the output signal VS, which is biased by the bias circuit 51, to the band pass filter 53. The band pass filter 53 selectively passes components in a predetermined frequency range among the signals supplied from the buffer circuit 52, and removes other components.

The sample hold circuit 54 samples the signal output from the band pass filter 53 at a cycle based on the cycle of the input signal Vin supplied from the AC power supply 22, and holds a voltage value of the sampled signal until the operation of the analog-to-digital conversion circuit 57 ends. In addition, the sample hold circuit 54 outputs the sampled signal to the low pass filter 55. The low pass filter 55 removes a frequency component larger than a predetermined threshold value from the signal input to the low pass filter 55, and outputs frequency components equal to or less than the predetermined threshold value to the amplification circuit 56. The amplification circuit 56 amplifies the signal supplied from the low pass filter 55 at a predetermined amplification factor, and outputs the amplified signal to the analog-to-digital conversion circuit 57.

The analog-to-digital conversion circuit 57 converts the analog signal output from the amplification circuit 56 into a digital signal. The analog-to-digital conversion circuit 57 outputs the digital signal to the control device 7. The signal supplied from the analog-to-digital conversion circuit 57 to the control device 7 is a signal representing ink amount information DR indicating a magnitude of the detection signal Vout selected as the output signal VS by the selection circuit 4[*m*]. Here, the magnitude of the detection signal Vout indicated by the ink amount information DR is, for example, an amplitude Aout of the detection signal Vout. However, the magnitude of the detection signal Vout indicated by the ink amount information DR may be an effective value of the detection signal Vout.

Next, the amplitude Aout of the detection signal Vout indicated by the ink amount information DR will be explained with reference to FIG. 9.

Figure 9:
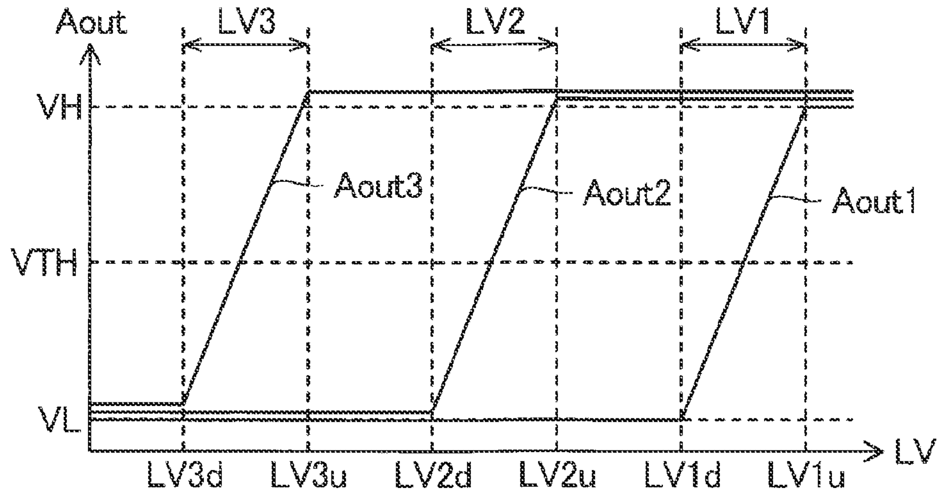
FIG. 9 is an explanatory diagram showing an example of a relationship between a liquid level height and an amplitude of a detection signal.

FIG. 9 is an explanatory diagram showing an example of a relationship between the liquid level height LV and the amplitude Aout of the detection signal Vout. A vertical axis in FIG. 9 indicates the amplitude Aout of the detection signal Vout, and a horizontal axis in FIG. 9 indicates the liquid level height LV.

In FIG. 9, a liquid level height LV1*d* is a height from the wall 10E to an end portion of the detection electrode EB1 in the Z1 direction. A liquid level height LV1*u* is a height from the wall 10E to an end portion of the detection electrode EB1 in the Z2 direction. That is, a liquid level range LV1 from the liquid level height LV1*d* to the liquid level height LV1*u* is a range of the liquid level height LV from a case where the ink IK is at a lower end of the detection electrode EB1 to a case where the ink IK is at an upper end of the detection electrode EB1 inside the ink tank TK[m].

In addition, in FIG. 9, a liquid level height LV2*d* is a height from the wall 10E to an end portion of the detection electrode EB2 in the Z1 direction. A liquid level height LV2*u* is a height from the wall 10E to an end portion of the detection electrode EB2 in the Z2 direction. That is, a liquid level range LV2 from the liquid level height LV2*d* to the liquid level height LV2*u* is a range of the liquid level height LV from a case where the ink IK is at a lower end of the detection electrode EB2 to a case where the ink IK is at an upper end of the detection electrode EB2 inside the ink tank TK[m].

In addition, in FIG. 9, a liquid level height LV3*d* is a height from the wall 10E to an end portion of the detection electrode EB3 in the Z1 direction. A liquid level height LV3*u* is a height from the wall 10E to an end portion of the detection electrode EB3 in the Z2 direction. That is, a liquid level range LV3 from the liquid level height LV3*d* to the liquid level height LV3*u* is a range of the liquid level height LV from a case where the ink IK is at a lower end of the detection electrode EB3 to a case where the ink IK is at an upper end of the detection electrode EB3 inside the ink tank TK[m].

In general, a relative permittivity of the ink IK is larger than a relative permittivity of the air. For this reason, when a space corresponding to the liquid level range LV1 located between the input electrode EA and the detection electrode EB1 in the ink tank TK[m] is filled with ink IK, the electrostatic capacitance of the capacitor CC1 becomes larger than when the space is filled with the air. Similarly, when a space corresponding to the liquid level range LV2 located between the input electrode EA and the detection electrode EB2 in the ink tank TK[m] is filled with ink IK, the electrostatic capacitance of the capacitor CC2 becomes larger than when the space is filled with the air. Similarly, when a space corresponding to the liquid level range LV3 located between the input electrode EA and the detection electrode EB3 in the ink tank TK[m] is filled with ink IK, the electrostatic capacitance of the capacitor CC3 becomes larger than when the space is filled with the air.

In addition, in general, when an area of the capacitor is large, the electrostatic capacitance of the capacitor becomes larger than when the area of the capacitor is small. Specifically, when an area of the overlapping portion of the detection electrode EB1 and the input electrode EA is large when the ink tank TK[m] is viewed from the X2 direction to the X1 direction, the electrostatic capacitance of the capacitor CC1 becomes larger than when the area is small. In addition, when an area of the overlapping portion of the detection electrode EB2 and the input electrode EA is large when the ink tank TK[m] is viewed from the X2 direction to the X1 direction, the electrostatic capacitance of the capacitor CC2 becomes larger than when the area is small. In addition, when an area of the overlapping portion of the detection electrode EB3 and the input electrode EA is large when the ink tank TK[m] is viewed from the X2 direction to the X1 direction, the electrostatic capacitance of the capacitor CC3 becomes larger than when the area is small.

In the present embodiment, as an example, it is assumed that the input electrode EA, and the detection electrodes EB1, EB2, and EB3 are provided so that the input electrode EA covers all of the detection electrode EB1, all of the detection electrode EB2, and all of the detection electrode EB3 when the ink tank TK[m] is viewed from the X2 direction to the X1 direction. For this reason, in the present embodiment, when the area of the detection electrode EB1 is large, the electrostatic capacitance of the capacitor CC1 becomes larger than when the area is small. In addition, in the present embodiment, when the area of the detection electrode EB2 is large, the electrostatic capacitance of the capacitor CC2 becomes larger than when the area is small. In addition, in the present embodiment, when the area of the detection electrode EB3 is large, the electrostatic capacitance of the capacitor CC3 becomes larger than when the area is small.

When the electrostatic capacitance of the capacitor CC1 is large, an amplitude Aout1 of the detection signal Vout1 becomes larger than when the electrostatic capacitance of the capacitor CC1 is small. Similarly, when the electrostatic capacitance of the capacitor CC2 is large, an amplitude Aout2 of the detection signal Vout2 becomes larger than when the electrostatic capacitance of the capacitor CC2 is small. Similarly, when the electrostatic capacitance of the capacitor CC3 is large, an amplitude Aout3 of the detection signal Vout3 becomes larger than when the electrostatic capacitance of the capacitor CC3 is small.

For this reason, as shown in FIG. 9, when the liquid level height LV is equal to or larger than the liquid level height LV1*u*, the amplitude Aout1 of the detection signal Vout1 becomes larger than when the liquid level height LV is equal to or less than the liquid level height LV1*d*. In addition, when the liquid level height LV is equal to or larger than the liquid level height LV2*u*, the amplitude Aout2 of the detection signal Vout2 becomes larger than when the liquid level height LV is equal to or less than the liquid level height LV2*d*. In addition, when the liquid level height LV is equal to or larger than the liquid level height LV3*u*, the amplitude Aout3 of the detection signal Vout3 becomes larger than when the liquid level height LV is equal to or less than the liquid level height LV3*d*.

Specifically, in the present embodiment, the detection electrode EB1 is provided so that the amplitude Aout1 of the detection signal Vout1 is a voltage VH when the liquid level height LV is equal to or larger than the liquid level height LV1*u*, and the amplitude Aout1 of the detection signal Vout1 is a voltage VL smaller than the voltage VH when the liquid level height LV is equal to or less than the liquid level height LV1*d*. In addition, in the present embodiment, the detection electrode EB2 is provided so that the amplitude Aout2 of the detection signal Vout2 is a voltage VH when the liquid level height LV is equal to or larger than the liquid level height LV2*u*, and the amplitude Aout2 of the detection signal Vout2 is a voltage VL when the liquid level height LV is equal to or less than the liquid level height LV2*d*. In addition, in the present embodiment, the detection electrode EB3 is provided so that the amplitude Aout3 of the detection signal Vout3 is a voltage VH when the liquid level height LV is equal to or larger than the liquid level height LV3*u*, and the amplitude Aout3 of the detection signal Vout3 is a voltage VL when the liquid level height LV is equal to or less than the liquid level height LV3*d*. A threshold value voltage VTH shown in FIG. 9 is a voltage that is smaller than the voltage VH and larger than the voltage VL.

Next, an overview of an ink remaining amount determination process executed by the control device 7 will be explained with reference to FIG. 10. Here, the ink remaining amount determination process is a process of determining the remaining amount of the ink IK stored in the ink tank TK[m] based on the ink amount information DR.

A. 5. Overview of Ink Remaining Amount Determination Process

Figure 10:
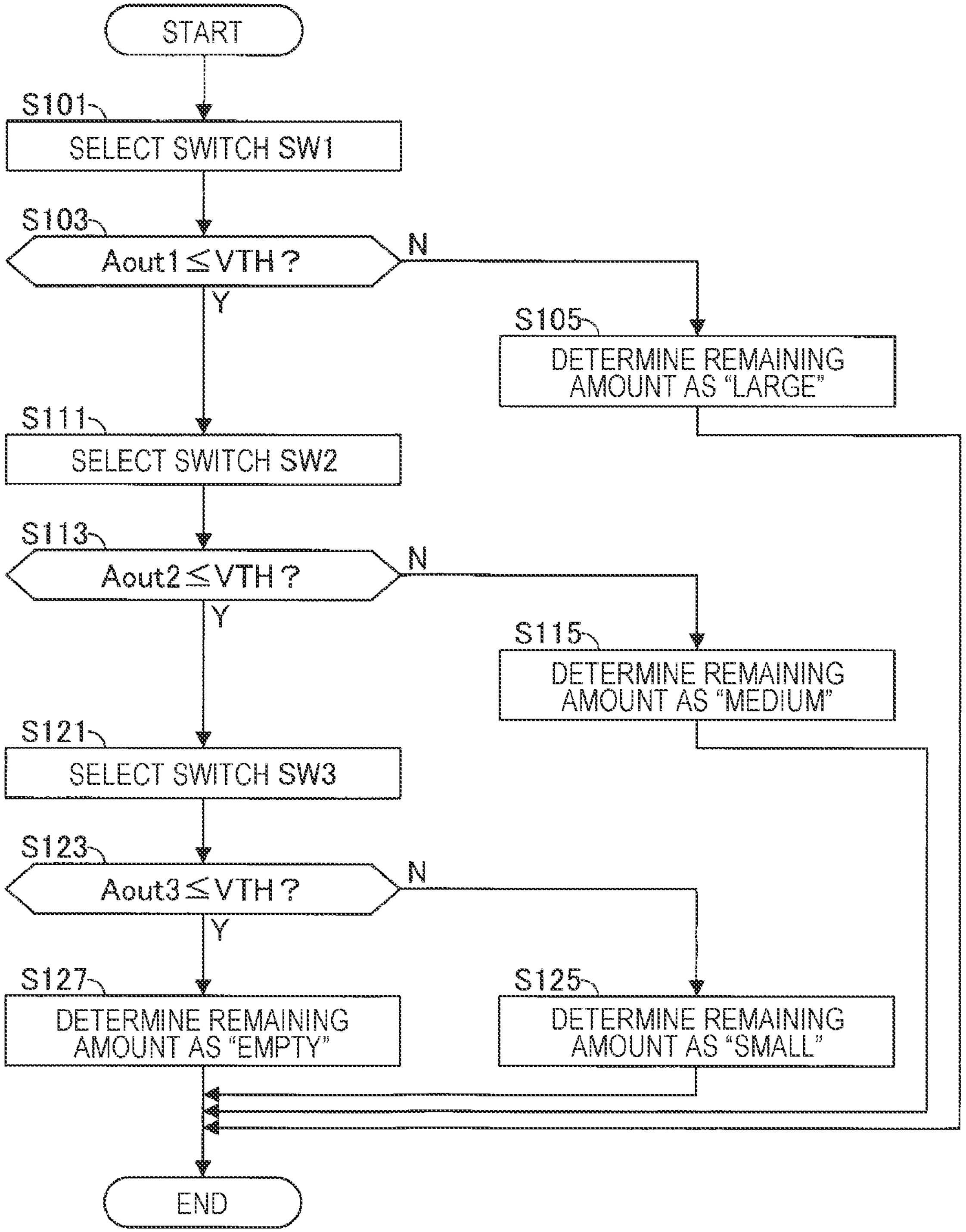
FIG. 10 is a flowchart showing an example of an ink remaining amount determination process.

FIG. 10 is a flowchart showing an example of the ink remaining amount determination process.

First, in Step S101, the control device 7 selects the switch SW1 corresponding to the detection electrode EB1 that outputs the detection signal Vout1. For example, the control device 7 supplies the selection signal Se1 to select the switch SW1 to the selection circuit 4[*m*]. That is, the control device 7 electrically couples the input terminal IN1 and the output terminal OS via the switch SW1, and causes the selection circuit 4[*m*] to output the detection signal Vout1 as the output signal VS.

Next, in Step S103, the control device 7 determines whether or not the amplitude Aout1 indicated by the ink amount information DR output by the ink amount information generation circuit 5[*m*] is equal to or less than the threshold value voltage VTH.

When a result of the determination in Step S103 is negative, the control device 7 determines that the remaining amount of the ink IK stored in the ink tank TK[m] is "large" in Step S105, and ends the ink remaining amount determination process shown in FIG. 10. That is, when the amplitude Aout1 indicated by the ink amount information DR is larger than the threshold value voltage VTH, the control device 7 determines that the remaining amount of the ink IK stored in the ink tank TK[m] is "large", and ends the ink remaining amount determination process.

On the other hand, when the result of the determination in Step S103 is affirmative, that is, when the amplitude Aout1 indicated by the ink amount information DR is equal to or less than the threshold value voltage VTH, the control device 7 advances the process to Step S111.

In Step S111, the control device 7 selects the switch SW2 corresponding to the detection electrode EB2 that outputs the detection signal Vout2. For example, the control device 7 supplies the selection signal Se1 to select the switch SW2 to the selection circuit 4[*m*]. That is, the control device 7 electrically couples the input terminal IN2 and the output terminal OS via the switch SW2, and causes the selection circuit 4[*m*] to output the detection signal Vout2 as the output signal VS.

Next, in Step S113, the control device 7 determines whether or not the amplitude Aout2 indicated by the ink amount information DR output by the ink amount information generation circuit 5[*m*] is equal to or less than the threshold value voltage VTH.

When a result of the determination in Step S113 is negative, the control device 7 determines that the remaining amount of the ink IK stored in the ink tank TK[m] is "medium" in Step S115, and ends the ink remaining amount determination process shown in FIG. 10. That is, when the amplitude Aout2 indicated by the ink amount information DR is larger than the threshold value voltage VTH, the control device 7 determines that the remaining amount of the ink IK stored in the ink tank TK[m] is "medium", and ends the ink remaining amount determination process. When the remaining amount of the ink IK is "medium", the remaining amount of the ink IK stored in the ink tank TK[m] is smaller than when the remaining amount of the ink IK is "large".

On the other hand, when the result of the determination in Step S113 is affirmative, that is, when the amplitude Aout2 indicated by the ink amount information DR is equal to or less than the threshold value voltage VTH, the control device 7 advances the process to Step S121.

In Step S121, the control device 7 selects the switch SW3 corresponding to the detection electrode EB3 that outputs the detection signal Vout3. For example, the control device 7 supplies the selection signal Se1 to select the switch SW3 to the selection circuit 4[*m*]. That is, the control device 7 electrically couples the input terminal IN3 and the output terminal OS via the switch SW3, and causes the selection circuit 4[*m*] to output the detection signal Vout3 as the output signal VS.

Next, in Step S123, the control device 7 determines whether or not the amplitude Aout3 indicated by the ink amount information DR output by the ink amount information generation circuit 5[*m*] is equal to or less than the threshold value voltage VTH.

When a result of the determination in Step S123 is negative, the control device 7 determines that the remaining amount of the ink IK stored in the ink tank TK[m] is "small" in Step S125, and ends the ink remaining amount determination process shown in FIG. 10. That is, when the amplitude Aout3 indicated by the ink amount information DR is larger than the threshold value voltage VTH, the control device 7 determines that the remaining amount of the ink IK stored in the ink tank TK[m] is "small", and ends the ink remaining amount determination process. When the remaining amount of the ink IK is "small", the remaining amount of the ink IK stored in the ink tank TK[m] is smaller than when the remaining amount of the ink IK is "medium".

On the other hand, when a result of the determination in Step S123 is affirmative, the control device 7 determines that the remaining amount of the ink IK stored in the ink tank TK[m] is "empty" in Step S127, and ends the ink remaining amount determination process shown in FIG. 10. That is, when the amplitude Aout3 indicated by the ink amount information DR is equal to or less than the threshold value voltage VTH, the control device 7 determines that the remaining amount of the ink IK stored in the ink tank TK[m] is "empty", and ends the ink remaining amount determination process. When the remaining amount of the ink IK is "empty", the remaining amount of the ink IK stored in the ink tank TK[m] is smaller than when the remaining amount of the ink IK is "small".

Next, an effect of the protrusion portion PT will be explained with reference to FIG. 11.

Figure 11:
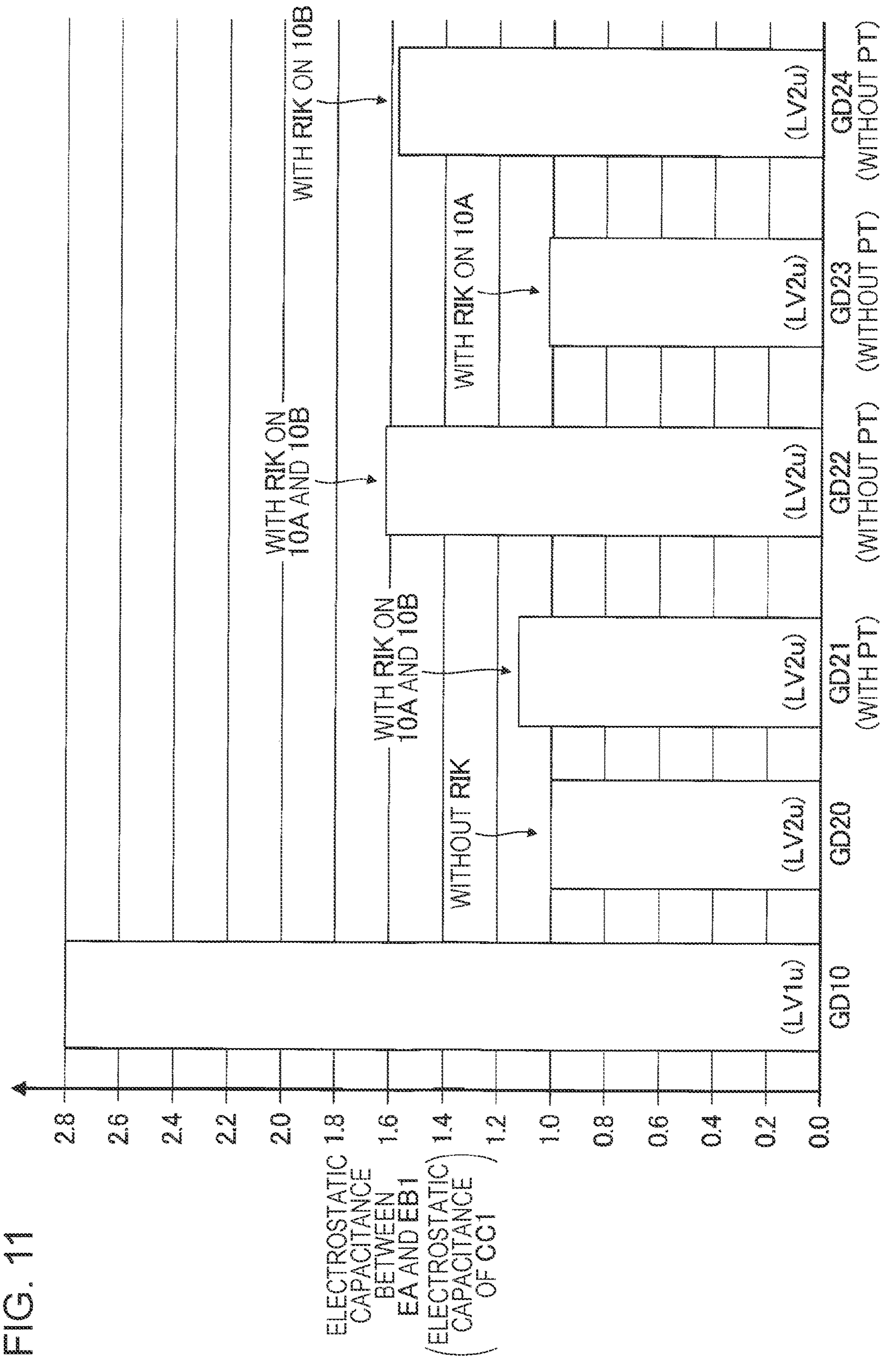
FIG. 11 is an explanatory diagram for explaining an effect of a protrusion portion.

FIG. 11 is an explanatory diagram for explaining the effect of the protrusion portion PT. The graph of FIG. 11 shows a measured value of the electrostatic capacitance between the input electrode EA and the detection electrode EB1, that is, a measured value of the electrostatic capacitance of the capacitor CC1. FIG. 11 shows the relative capacity value of the capacitor CC1 to the electrostatic capacitance when the liquid level height LV is the liquid level height LV2*u* and the non-detection material RIK does not adhere to any of the walls 10A and 10B. The non-detection material RIK is the liquid residue of the ink IK such as the liquid residue of the ink IK adhering to the inner surface IFa of the wall 10A and the liquid residue of the ink IK adhering to the inner surface IFb of the wall 10B as described in FIG. 6.

In FIG. 11, graph data GD10 indicates the electrostatic capacitance of the capacitor CC1 when the liquid level height LV is the liquid level height LV1*u*. Graph data GD20 indicates the electrostatic capacitance of the capacitor CC1 when the liquid level height LV is the liquid level height LV2*u* and the non-detection material RIK does not adhere to any of the walls 10A and 10B. That is, the graph data GD20 indicates the reference electrostatic capacitance in this graph.

Graph data GD21 indicates the electrostatic capacitance of the capacitor CC1 when the liquid level height LV is the liquid level height LV2*u* and the non-detection material RIK adheres to the walls 10A and 10B in the configuration where the protrusion portion PT is provided. That is, the graph data GD21 indicates the electrostatic capacitance of the capacitor CC1 in the present embodiment. Here, in the graph data GD21, a state in which the non-detection material RIK adheres to the wall 10B is, for example, a state in which the non-detection material RIK adhering to the inner surface IFb of the specific portion RP1 between the detection electrodes EB1 and EB2 in the wall 10B is separated by the protrusion portion PT1.

Graph data GD22, GD23, and GD24 indicate the configuration in which the protrusion portion PT is not provided, that is, the electrostatic capacitance of the capacitor CC1 in the comparative example compared to the present embodiment. For example, the graph data GD22 indicates the electrostatic capacitance of the capacitor CC1 when the liquid level height LV is the liquid level height LV2*u* and the non-detection material RIK adheres to the walls 10A and 10B, in the comparative example. The graph data GD23 indicates the electrostatic capacitance of the capacitor CC1 when the liquid level height LV is the liquid level height LV2*u* and the non-detection material RIK adheres to only the wall 10A among the walls 10A and 10B, in the comparative example. The graph data GD24 indicates the electrostatic capacitance of the capacitor CC1 when the liquid level height LV is the liquid level height LV2*u* and the non-detection material RIK adheres to only the wall 10B among the walls 10A and 10B, in the comparative example. Here, in the graph data GD22 and GD24, a state in which the non-detection material RIK adheres to the wall 10B is, for example, a state in which the non-detection material RIK continuously adheres to the inner surface IFb of the specific portion RP1 between the detection electrodes EB1 and EB2 in the wall 10B.

As shown in the graph data GD10 and GD20, when the liquid level height LV changes from the liquid level height LV1*u* to the liquid level height LV2*u*, it is ideal that the electrostatic capacitance of the capacitor CC1 changes greatly. In the following, the amount of change from the electrostatic capacitance indicated by the graph data GD10 to the electrostatic capacitance indicated by the graph data GD20 is also referred to as a desired amount of change. In addition, in the following, the electrostatic capacitance indicated by the graph data GD20 is also referred to as a desired electrostatic capacitance.

In the comparative example, as shown in the graph data GD20 and GD24, when the non-detection material RIK adheres to the wall 10B where the detection electrode EB1 is provided, the electrostatic capacitance of the capacitor CC1 when the liquid level height LV is the liquid level height LV2*u* is substantially 1.5 times the desired electrostatic capacitance. From this, in the comparative example, it can be considered that the non-detection material RIK adhering to the wall 10B has an influence on the capacitor CC1. For example, in the comparative example, it can be considered that the ink IK in the corresponding space between the input electrode EA and the detection electrode EB2 in the ink tank TK[m] has an influence on the capacitor CC1 via the non-detection material RIK adhering to the wall 10B.

As described above, in the comparative example, when the non-detection material RIK adheres to the wall 10B, the electrostatic capacitance of the capacitor CC1 when the liquid level height LV is the liquid level height LV2*u* becomes larger than the desired electrostatic capacitance due to the influence of the non-detection material RIK. Therefore, in the comparative example, the amount of change in the electrostatic capacitance of the capacitor CC1 when the liquid level height LV changes from the liquid level height LV1*u* to the liquid level height LV2*u* becomes smaller than a desired amount of change due to the influence of the non-detection material RIK adhering to the wall 10B. As a result, in the comparative example, there is a concern that, when the liquid level height LV changes from the liquid level height LV1*u* to the liquid level height LV2*u*, the amount of change in the amplitude Aout1 of the detection signal Vout1 becomes small, and the remaining amount of the ink IK stored in the ink tank TK[m] is erroneously detected.

For example, in the comparative example, there is a concern that, when the liquid level height LV is the liquid level height LV2*u*, the amplitude Aout1 of the detection signal Vout1 becomes larger than the threshold value voltage VTH. Therefore, in the comparative example, there is a concern that, even when the liquid level height LV is equal to or less than the liquid level height LV1*d*, it is erroneously determined that the remaining amount of the ink IK stored in the ink tank TK[m] is "large".

On the other hand, in the present embodiment, as shown in the graph data GD20 and GD21, even when the non-detection material RIK adheres to the wall 10B, the electrostatic capacitance of the capacitor CC1 when the liquid level height LV is the liquid level height LV1*u* is substantially 1.1 times the desired electrostatic capacitance. As described above, in the present embodiment, when the non-detection material RIK adheres to the wall 10B, the amount by which the electrostatic capacitance of the capacitor CC1 increases with respect to the desired electrostatic capacitance can be suppressed by the protrusion portion PT1.

For example, the protrusion portion PT1 prevents the non-detection material RIK from continuously adhering from the lower end of the detection electrode EB1 to the upper end of the detection electrode EB2, in the wall 10B. Accordingly, in the present embodiment, the formation of an electrical path from the detection electrode EB1 to the detection electrode EB2 via the non-detection material RIK can be suppressed. In other words, in the present embodiment, an electrical path formed from the detection electrode EB1 to the detection electrode EB2 via the non-detection material RIK can be separated by the protrusion portion PT1. Accordingly, in the present embodiment, the influence that the capacitor CC1 receives from the ink IK existing in the corresponding space between the input electrode EA and the detection electrode EB2 in the ink tank TK[m] via the non-detection material RIK can be reduced.

As described above, in the present embodiment, even when the non-detection material RIK adheres to the wall 10B, the amount of increase in the electrostatic capacitance of the capacitor CC1, when the liquid level height LV is the liquid level height LV2*u*, with respect to the desired electrostatic capacitance can be suppressed. Therefore, in the present embodiment, even when the non-detection material RIK adheres to the wall 10B, the amount of change in the electrostatic capacitance of the capacitor CC1 when the liquid level height LV changes from the liquid level height LV1*u* to the liquid level height LV2*u* can be ensured to be substantially the same as the desired amount of change. Accordingly, in the present embodiment, it is possible to suppress the amount of change in the amplitude Aout1 of the detection signal Vout1 from becoming small when the liquid level height LV changes from the liquid level height LV1*u* to the liquid level height LV2*u*. As a result, in the present embodiment, it is possible to suppress the remaining amount of the ink IK stored in the ink tank TK[m] from being erroneously detected. That is, in the present embodiment, it is possible to accurately detect the remaining amount of the ink IK stored in the ink tank TK[m].

In the present embodiment, even when the liquid level height LV changes from the liquid level height LV2*u* to the liquid level height LV3*u*, the protrusion portion PT2 can suppress a decrease in the amount of change in the electrostatic capacitance of the capacitor CC2.

A. 6. Conclusion of Embodiment

As described above, in the present embodiment, the ink jet printer 100 includes the ink tank TK[m] including the plurality of walls 10 and storing the ink IK in the space surrounded by the plurality of walls 10, the liquid discharge head HU[m] that discharges the ink IK supplied from the ink tank TK[m], the detection electrode EB1 and the detection electrode EB2 that are provided on the outer surface OFb of the wall 10B among the plurality of walls 10 for detecting the remaining amount of the ink IK in the ink tank TK[m], and the protrusion portion PT1 that is provided on the inner surface IFb of the wall 10B opposite to the outer surface OFb. The protrusion portion PT1 is located between the detection electrode EB1 and the detection electrode EB2 in the X1 direction, which is a direction in which the ink IK decreases in the ink tank TK[m]. The storage device 3 according to the present embodiment has the ink tank TK[m], the detection electrodes EB1 and EB2, and the protrusion portion PT1 among the above-described elements.

As described above, in the present embodiment, the protrusion portion PT1 is provided at a corresponding position between the detection electrodes EB1 and EB2 on the inner surface IFb of the wall 10B. Therefore, in the present embodiment, the protrusion portion PT1 can prevent the liquid residue of the ink IK adhering to the inner surface IFb of the wall 10B from continuously adhering from the detection electrode EB1 to the detection electrode EB2 in the wall 10B as the non-detection material RIK. Accordingly, in the present embodiment, even when the non-detection material RIK adheres to the wall 10B, an influence on the capacitor CC1 formed between the input electrode EA and the detection electrode EB1 can be reduced via the non-detection material RIK. As a result, in the present embodiment, it is possible to suppress the remaining amount of the ink IK stored in the ink tank TK[m] from being erroneously detected. That is, in the present embodiment, it is possible to accurately detect the remaining amount of the ink IK stored in the ink tank TK[m].

In addition, in the present embodiment, the storage device 3 further has the input electrode EA that is provided on the wall 10A facing the wall 10B among the plurality of walls 10, and to which the input signal Vin is supplied. That is, in the present embodiment, the "first electrode" and the "second electrode" are the detection electrode EB that outputs the detection signal Vout based on the remaining amount of the ink IK in the ink tank TK[m] and the input signal Vin. As described above, in the present embodiment, in the configuration in which the input electrode EA is provided on the wall 10A and the plurality of detection electrodes EB are provided on the wall 10B, the remaining amount of the ink IK stored in the ink tank TK[m] can be accurately detected.

B. Modification Example

Each of the above exemplified embodiments can be variously modified. Specific aspects of modification are exemplified in the following. Two or more aspects optionally selected from the following examples can be appropriately combined within a scope where the aspects do not conflict with each other.

First Modification Example

In the above-described embodiment, the protrusion portion PT1 may be subjected to a water-repellent treatment. For example, the water-repellent treatment may be a water-repellent treatment with a silicone-based coating. The water-repellent treatment is not limited to the water-repellent treatment with the silicone-based coating. For example, the water-repellent treatment may be a water-repellent treatment with a fluorine-based coating.

As described above, even in the present modification example, the same effect as that of the above-described embodiment can be obtained. Further, in the present modification example, since the protrusion portion PT1 is subjected to the water-repellent treatment, it is possible to improve the effect of preventing the non-detection material RIK from continuously adhering to the detection electrode EB1 to the detection electrode EB2 on the wall 10B. Accordingly, in the present modification example, it is possible to more accurately detect the remaining amount of the ink IK stored in the ink tank TK[m]. In addition, in the present modification example, since it is not necessary to apply the water-repellent treatment to the entire inner surface IFb of the wall 10B, less water-repellent treatment is required than when the entire inner surface IFb of the wall 10B is subjected to the water-repellent treatment. As a result, in the present modification example, it is possible to suppress an increase in the manufacturing cost of the storage device 3 and the ink jet printer 100 as compared with a case where the entire inner surface IFb of the wall 10B is subjected to the water-repellent treatment.

Second Modification Example

In the above-described embodiment and modification examples, a predetermined range around the protrusion portion PT1 in the inner surface IFb of the wall 10B may be subjected to the water-repellent treatment. For example, in the specific portion RP1 of the wall 10B, a portion excluding a portion at which the protrusion portion PT1 is formed may be subjected to the water-repellent treatment. Similarly, in the specific portion RP2 of the wall 10B, a portion excluding a portion at which the protrusion portion PT2 is formed may be subjected to the water-repellent treatment. In the above-described first modification example, the portion to which the water-repellent treatment is applied also includes the protrusion portion PT.

A range to which the water-repellent treatment is applied is not limited to the specific portions RP1 and RP2. For example, a range narrower than the specific portion RP1 may be subjected to the water-repellent treatment, or a range wider than the specific portion RP1 may be subjected to the water-repellent treatment. Similarly, a range narrower than the specific portion RP2 may be subjected to the water-repellent treatment, or a range wider than the specific portion RP2 may be subjected to the water-repellent treatment.

As described above, also in the present modification example, it is possible to obtain the same effect as that of the above-described embodiment and modification examples. For example, in the present modification example, since the water-repellent treatment is applied to the periphery of the protrusion portion PT, it is possible to improve the effect of preventing the non-detection material RIK from continuously adhering to the detection electrode EB1 to the detection electrode EB2 on the wall 10B.

Third Modification Example

In the above-described embodiment and the first modification example, a hydrophilic treatment may be applied to a predetermined range around the protrusion portion PT1 in the inner surface IFb of the wall 10B.

Figure 12:
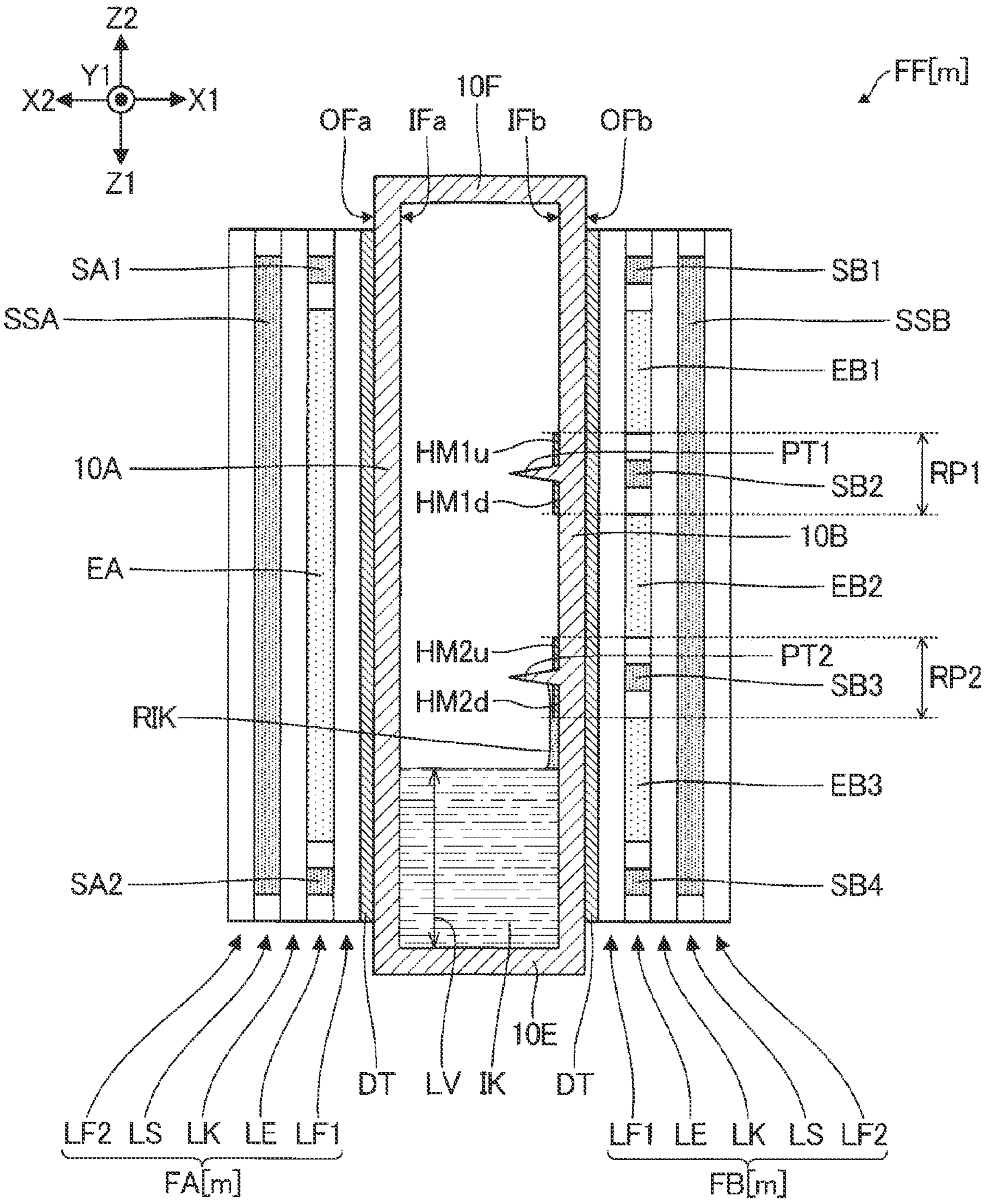
FIG. 12 is a cross-sectional view showing an example of a configuration of an ink management device according to a third modification example.

FIG. 12 is a cross-sectional view showing an example of a configuration of the ink management device FF[m] according to the third modification example. In FIG. 12, similar to FIG. 6 described above, a cross-sectional view of the ink management device FF[m] when the ink management device FF[m] is cut to include the electrode forming regions RA and RB is shown by a plane with the Y1 direction as the normal direction. The same elements as those described in FIGS. 1 to 11 are denoted by the same reference signs, and detailed descriptions thereof will be omitted.

The ink management device FF[m] shown in FIG. 12 is similar to the ink management device FF[m] shown in FIG. 6 except that hydrophilic films HM1*u* and HM1*d* are provided in the periphery of the protrusion portion PT1 and hydrophilic films HM2*u* and HM2*d* are provided in the periphery of the protrusion portion PT2. In the following, the hydrophilic films HM1*u* and HM1*d* may be collectively referred to as a hydrophilic film HM1, and the hydrophilic films HM2*u* and HM2*d* may be collectively referred to as a hydrophilic film HM2. Further, in the following, the hydrophilic films HM1*u*, HM1*d*, HM2*u*, and HM2*d* may be collectively referred to as a hydrophilic film HM.

For example, the hydrophilic film HM1 is provided in a portion of the specific portion RP1 of the wall 10B excluding a portion where the protrusion portion PT1 is formed, and the hydrophilic film HM2 is provided in a portion of the specific portion RP2 of the wall 10B excluding a portion where the protrusion portion PT2 is formed. The method for forming the hydrophilic film MH is not particularly limited. For example, the hydrophilic film MH is formed of any known hydrophilic material.

In FIG. 12, it is assumed that an end portion of the hydrophilic film MH1*u* in the Z2 direction coincides or substantially coincides with an end portion of the detection electrode EB1 in the Z1 direction, and an end portion of the hydrophilic film MH1*d* in the Z1 direction coincides or substantially coincides with an end portion of the detection electrode EB2 in the Z2 direction. Similarly, in FIG. 12, it is assumed that an end portion of the hydrophilic film MH2*u* in the Z2 direction coincides or substantially coincides with an end portion of the detection electrode EB2 in the Z1 direction, and an end portion of the hydrophilic film MH2*d* in the Z1 direction coincides or substantially coincides with an end portion of the detection electrode EB3 in the Z2 direction. However, the positions of the end portion in the Z2 direction and the end portion in the Z1 direction of the hydrophilic film MH are not limited to the example shown in FIG. 12. For example, the end portion of the hydrophilic film MH1*u* in the Z2 direction may be located between the end portion of the detection electrode EB1 in the Z1 direction and the protrusion portion PT1. Similarly, the end portion of the hydrophilic film MH1*d* in the Z1 direction may be located between the end portion of the detection electrode EB2 in the Z2 direction and the protrusion portion PT1.

As described above, also in the present modification example, it is possible to obtain the same effect as that of the above-described embodiment and the first modification example. Further, in the present modification example, since the hydrophilic treatment is applied to the periphery of the protrusion portion PT, the non-detection material RIK adhering to the inner surface IFb of the wall 10B is attracted to the periphery of the protrusion portion PT. Accordingly, in the present modification example, the non-detection material RIK adhering to the inner surface IFb of the wall 10B can be reliably separated on the protrusion portion PT. Accordingly, in the present modification example, it is possible to more accurately detect the remaining amount of the ink IK stored in the ink tank TK[m].

Fourth Modification Example

In the above-described embodiment, the ink IK, which is a "liquid", is exemplified and explained as an example of an object stored in the ink tank TK[m], but the present disclosure is not limited to such an aspect. The ink tank TK[m] may be capable of storing objects other than the ink IK. For example, the ink tank TK[m] may be capable of storing fluids such as oil, or may be capable of storing gel-like objects. As described above, also in the present modification example, it is possible to obtain the same effect as that of the above-described embodiment and modification examples.

Fifth Modification Example

In the above-described embodiment and modification examples, a case where the protrusion portion PT1 is located between the detection electrodes EB1 and EB2 and the protrusion portion PT2 is located between the detection electrodes EB2 and EB3 is exemplified and explained, but the present disclosure is not limited to such an aspect. For example, the input electrode EA and the detection electrode EB may be provided on one of the walls 10A and 10B. Specifically, for example, in the wall 10B, one input electrode EA and one detection electrode EB may be disposed along the X1 direction. The protrusion portion PT may be provided at a corresponding position between the input electrode EA and the detection electrode EB on the inner surface IFb of the wall 10B.

In the present modification example, the plurality of input electrodes EA and the plurality of detection electrodes EB are provided on the wall 10B so that the input electrode EA and the detection electrode EB are alternately disposed along the X1 direction. Also in this case, the protrusion portion PT is provided at a corresponding position between the input electrode EA and the detection electrode EB on the inner surface IFb of the wall 10B.

That is, in the present modification example, one of the "first electrode" and the "second electrode" is the input electrode EA to which the input signal Vin is supplied, and the other of the "first electrode" and the "second electrode" is the detection electrode EB that outputs the detection signal Vout based on the remaining amount of the ink IK in the ink tank TK[m] and the input signal Vin.

As described above, also in the present modification example, it is possible to obtain the same effect as that of the above-described embodiment and modification examples.

Sixth Modification Example

In the above-described embodiment and the modification examples, a case where the width WP of the protrusion portion PT along the Y direction is equal to or larger than the width WE of the detection electrode EB along the Y direction is exemplified and explained, but the present disclosure is not limited to such an aspect. For example, the width WP of the protrusion portion PT along the Y direction may be smaller than the width WE of the detection electrode EB along the Y direction. Further, the plurality of protrusion portions PT may be disposed along the Y direction. As described above, also in the present modification example, it is possible to obtain the same effect as that of the above-described embodiment and modification examples.

Seventh Modification Example

In the above-described embodiments and modification examples, a case where the ink amount detection device 2 has M selection circuits 4 and M ink amount information generation circuits 5 is exemplified and explained, but the present disclosure is not limited to such an aspect. The ink amount detection device 2 may have one or more selection circuits 4 and one or more ink amount information generation circuits 5. As described above, also in the present modification example, it is possible to obtain the same effect as that of the above-described embodiment and modification examples.

Eighth Modification Example

In the above-described embodiments and modification examples, a serial-type ink jet printer 100 in which the storage case 921 on which the liquid discharge head HU[m] is mounted is reciprocated in the X axis direction is exemplified, but the present disclosure is not limited to such an aspect. The ink jet printer 100 may be a line-type liquid discharge apparatus including the liquid discharge head HU[m] that is capable of discharging the ink IK over the entire width of the medium PP. As described above, also in the present modification example, it is possible to obtain the same effect as that of the above-described embodiment and modification examples.

Ninth Modification Example

The liquid discharge apparatus explained by exemplifying the ink jet printer 100 in the above-described embodiments and modification examples can be adopted in various apparatuses such as a facsimile machine and a copying machine in addition to an apparatus dedicated to printing. However, the application of the liquid discharge apparatus of the present disclosure is not limited to the printing. For example, a liquid discharge apparatus that discharges a solution of a coloring material is used as a manufacturing apparatus for forming a color filter of a liquid crystal display device. In addition, a liquid discharge apparatus that discharges a solution of a conductive material is used as a manufacturing apparatus for forming wiring and electrodes of a wiring substrate. As described above, also in the present modification example, it is possible to obtain the same effect as that of the above-described embodiment and modification examples.

C. Application Example

According to a combination of one input electrode EA and one detection electrode EB, it may be determined whether the remaining amount of the ink IK stored in the ink tank TK[m] is "large", "small", or "empty". In this case, the protrusion portion PT may be provided at a corresponding position between the upper end and the lower end of the detection electrode EB in the Z direction in the inner surface IFb of the wall 10B on which the detection electrode EB is provided. For example, the protrusion portion PT may be provided at a position corresponding to the vicinity of the middle of the detection electrode EB in the Z direction in the inner surface IFb of the wall 10B. In this case, the amplitude Aout of the detection signal Vout may be compared with two threshold value voltages, specifically a first threshold value voltage and a second threshold value voltage. For example, the first threshold value voltage is smaller than the voltage VH and larger than the median voltage between the voltages VH and VL, and the second threshold value voltage is smaller than the median voltage between the voltages VH and VL and larger than the voltage VL. Also in the present application example, the amount of change in the electrostatic capacitance between the input electrode EA and the detection electrode EB when the liquid level height LV changes from the upper end of the detection electrode EB in the Z direction to the lower end of the protrusion portion PT in the Z direction can be increased in comparison with a configuration in which the protrusion portion PT is not provided. Therefore, also in the present application example, the remaining amount of the ink IK stored in the ink tank TK[m] can be more accurately detected in comparison with the configuration in which the protrusion portion PT is not provided.

What is claimed is:

1. A liquid discharge apparatus comprising:

a storage section that includes a plurality of walls and stores a liquid in a space surrounded by the plurality of walls;

a discharging section that discharges the liquid supplied from the storage section;

a first electrode and a second electrode that are provided on a first surface of a first wall among the plurality of walls for detecting a remaining amount of the liquid in the storage section; and a protrusion portion that is provided on a second surface of the first wall opposite to the first surface, wherein the protrusion portion is located between the first electrode and the second electrode in a first direction, which is a direction in which the liquid decreases in the storage section.

2. The liquid discharge apparatus according to claim 1, wherein the protrusion portion is subjected to a water-repellent treatment.

3. The liquid discharge apparatus according to claim 1, wherein a predetermined range around the protrusion portion in the second surface is subjected to a water-repellent treatment.

4. The liquid discharge apparatus according to claim 1, wherein a predetermined range around the protrusion portion in the second surface is subjected to a hydrophilic treatment.

5. The liquid discharge apparatus according to claim 1, wherein one of the first electrode and the second electrode is an input electrode to which an input signal is supplied, and another of the first electrode and the second electrode is a detection electrode that outputs a detection signal based on the remaining amount of the liquid in the storage section and the input signal.

6. The liquid discharge apparatus according to claim 1, further comprising:

an input electrode that is provided on a second wall facing the first wall among the plurality of walls and to which an input signal is supplied, wherein the first electrode and the second electrode are detection electrodes that output a detection signal based on the remaining amount of the liquid in the storage section and the input signal.

7. A storage device comprising:

a storage section that includes a plurality of walls and stores an object in a space surrounded by the plurality of walls;

a first electrode and a second electrode that are provided on a first surface of a first wall among the plurality of walls for detecting a remaining amount of the object in the storage section; and a protrusion portion that is provided on a second surface of the first wall opposite to the first surface, wherein the protrusion portion is located between the first electrode and the second electrode in a first direction, which is a direction in which the object decreases in the storage section.

8. The storage device according to claim 7, wherein the object stored in the storage section is a liquid, and the protrusion portion is subjected to a water-repellent treatment.

9. The storage device according to claim 7, wherein the object stored in the storage section is a liquid, and a predetermined range around the protrusion portion in the second surface is subjected to a water-repellent treatment.

10. The storage device according to claim 7, wherein the object stored in the storage section is a liquid, and a predetermined range around the protrusion portion in the second surface is subjected to a hydrophilic treatment.

11. The storage device according to claim 7, wherein one of the first electrode and the second electrode is an input electrode to which an input signal is supplied, and another of the first electrode and the second electrode is a detection electrode that outputs a detection signal based on the remaining amount of the object in the storage section and the input signal.

12. The storage device according to claim 7, further comprising:

an input electrode that is provided on a second wall facing the first wall among the plurality of walls and to which an input signal is supplied, wherein the first electrode and the second electrode are detection electrodes that output a detection signal based on the remaining amount of the object in the storage section and the input signal.

* * * * *